(12) United States Patent
Peng et al.

(10) Patent No.: US 11,450,080 B2
(45) Date of Patent: Sep. 20, 2022

(54) IMAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Weilong Peng, Shenzhen (CN); Xiaoyong Shen, Shenzhen (CN); Yilun Chen, Shenzhen (CN); Yanan Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 106 days.

(21) Appl. No.: 17/088,558

(22) Filed: Nov. 3, 2020

(65) Prior Publication Data

US 2021/0049395 A1    Feb. 18, 2021

Related U.S. Application Data

(63) Continuation of application No. PCT/CN2019/113611, filed on Oct. 28, 2019.

(30) Foreign Application Priority Data

Nov. 19, 2018  (CN) .......................... 201811377195.6

(51) Int. Cl.
*G06V 10/22*    (2022.01)
*G06V 20/40*    (2022.01)
(Continued)

(52) U.S. Cl.
CPC .............. *G06V 10/22* (2022.01); *G06V 20/40* (2022.01); *G06V 40/103* (2022.01);
(Continued)

(58) Field of Classification Search
None
See application file for complete search history.

(56) References Cited

U.S. PATENT DOCUMENTS 9,860,441 B1 * 1/2018 Barron ................... G06T 7/277
10,110,846 B2 * 10/2018 Chen ...................... G06V 20/48
(Continued)

FOREIGN PATENT DOCUMENTS

CN          101833771 A      9/2010
CN          102222346 A      10/2011
(Continued)

OTHER PUBLICATIONS

Kim K, Hong S, Choi B, Kim E. Probabilistic ship detection and classification using deep learning. Applied Sciences. Jun. 2018;8(6):936. (Year: 2018).*

(Continued)

*Primary Examiner* — Michelle M Entezari
(74) *Attorney, Agent, or Firm* — Anova Law Group, PLLC

(57) ABSTRACT

An image processing method and apparatus, and a storage medium are provided. The method includes: detecting a target object in a current video frame of a target video stream, to obtain a current detection region for the target object; adjusting the current detection region according to a historic detection region corresponding to the target object in a historic video frame of the target video stream, to obtain a determined current detection region; performing key point positioning on the target object based on the determined current detection region, to obtain a first set of key points; and performing stabilization on locations of the key points in the first set according to locations of key points in a second set corresponding to the target object in the historic
(Continued)

video frame, to obtain current locations of a set of key points of the target object in the current video frame.

16 Claims, 13 Drawing Sheets

(51) Int. Cl.
*G06V 40/10* (2022.01)
*G06V 10/44* (2022.01)

(52) U.S. Cl.
CPC .... *G06T 2207/10016* (2013.01); *G06V 10/44* (2022.01); *G06V 2201/07* (2022.01)

(56) References Cited

U.S. PATENT DOCUMENTS

| | | | | |
|---|---|---|---|---|
| 10,171,738 | B1* | 1/2019 | Liang | G06T 15/20 |
| 10,757,369 | B1* | 8/2020 | Mukhopadhyay | H04N 7/181 |
| 2009/0303342 | A1* | 12/2009 | Corcoran | G06K 9/00 |
| | | | | 348/222.1 |
| 2016/0171656 | A1 | 6/2016 | Chen et al. | |
| 2018/0359420 | A1* | 12/2018 | Kuchnio | H04N 5/144 |
| 2019/0130191 | A1* | 5/2019 | Zhou | G06V 10/255 |
| 2019/0205623 | A1 | 7/2019 | Wang et al. | |

FOREIGN PATENT DOCUMENTS

| | | |
|---|---|---|
| CN | 105512627 A | 4/2016 |
| CN | 106205126 A | 12/2016 |
| CN | 106682619 A | 5/2017 |
| CN | 106778585 A | 5/2017 |
| CN | 106991388 A | 7/2017 |
| CN | 107784288 A | 3/2018 |
| CN | 107967693 A | 4/2018 |
| CN | 108230357 A | 6/2018 |
| CN | 108492287 A | 9/2018 |
| CN | 108830900 A | 11/2018 |
| CN | 109684920 A | 4/2019 |
| WO | WO-2014175484 A1 * | 10/2014 ............. G06T 5/002 |
| WO | 2018103525 A1 | 6/2018 |

OTHER PUBLICATIONS

Wu H, Xiao L, Sun L, Jeon B. A Novel Video Stabilization Model with Motion Morphological Component Priors. IEEE Transactions on Multimedia. Nov. 15, 2021. (Year: 2021).*
Roberto e Souza M, Maia HD, Pedrini H. Survey on Digital Video Stabilization: Concepts, Methods, and Challenges. ACM Computing Surveys (CSUR). Feb. 3, 2022;55(3):1-37. (Year: 2022).*
Xu Y, Zhang J, Maybank SJ, Tao D. Dut: Learning video stabilization by simply watching unstable videos. IEEE Transactions on Image Processing. Jun. 20, 2022. (Year: 2022).*
Abdelli A. Recursive motion smoothing for online video stabilization in wide-area surveillance. In2016 International Conference on Big Data and Smart Computing (BigComp) Jan. 18, 2016 (pp. 40-45). IEEE. (Year: 2016).*
Wu H, Xiao L, Shim HJ, Tang S. Video stabilisation with total warping variation model. IET Image Processing. Jul. 2017;11(7):465-74. (Year: 2017).*
WO2014175484A1 [machine translation] (Year: 2014).*
The European Patent Office (EPO) The Extended European Search Report for 19887883.7 dated Jan. 18, 2022 11 Pages (including translation).
Hui-Lee Ooi et al., "Multiple Object Tracking in Urban Traffic Scenes with a Multiclass Object Detector," arxiv.org, arXiv:1809.02073v1, Sep. 6, 2018 (Sep. 6, 2018). 10 pages.
Georgios Pavlakos et al., "6-DoF Object Pose from Semantic Keypoints," arxiv.org, arXiv:1703.04670v1, Mar. 14, 2017 (Mar. 14, 2017). 8 pages.
The World Intellectual Property Organization (WIPO) International Search Report for PCT/CN2019/113611 dated Feb. 5, 2020 5 Pages (including translation).
The State Intellectual Property Office of the People's Republic of China (SIPO) Office Action 1 for 201811377195.6 dated Apr. 9, 2020 10 Pages (including translation).

* cited by examiner

Comparison diagram before and after body slimming

IMAGE PROCESSING METHOD AND APPARATUS, AND STORAGE MEDIUM

CROSS-REFERENCES TO RELATED APPLICATIONS

This application is a continuation application of PCT Patent Application No. PCT/CN2019/113611, filed on Oct. 28, 2019, which claims priority to Chinese Patent Application No. CN201811377195.6, entitled "OBJECT KEY POINT POSITIONING METHOD AND APPARATUS, IMAGE PROCESSING METHOD AND APPARATUS, AND STORAGE MEDIUM" and filed with the China National Intellectual Property Administration on Nov. 19, 2018, the entire contents of both of which are incorporated herein by reference.

FIELD OF THE TECHNOLOGY

The present disclosure relates to the computer field, and in particular, to an object key point positioning method and apparatus, an image processing method and apparatus, and a storage medium.

BACKGROUND OF THE DISCLOSURE

Currently, for object key point positioning in a single Photoshop (PS) image (e.g., an image containing human body to be adjusted to show a slimmer body or longer legs), a user or a designer needs to determine object key points of a human body by using naked eyes, which is time-consuming and labor-consuming and is limited in an application scenario. In addition, in a video application, an image region in which an object is located is usually stretched as a whole during image adjustment. Even though the object key points are positioned, the accuracy of positioning the object key points is low when a jitter occurs between previous and subsequent video frames in a video.

Currently, for the problem of low accuracy of positioning the object key points, no effective solution has been provided yet.

SUMMARY

The embodiments of the present disclosure provide an object key point positioning method and apparatus, an image processing method and apparatus, and a storage medium, to resolve at least the technical problem of low accuracy and low efficiency of detecting the object key points in the related art.

According to an aspect of the embodiments of the present disclosure, an object key point positioning method is provided. The object key point positioning method is also referred as an image processing method. The method includes: detecting a target object in a current video frame of a target video stream, to obtain a current detection region for the target object; obtaining a historic detection region corresponding to the target object in a historic video frame of the target video stream; obtaining a determined current detection region according to the historic detection region and the current detection region; performing key point positioning on the target object based on the determined current detection region, to obtain a first set of key points; obtaining a second set of key points corresponding to the target object in the historic video frame of the target video stream; and performing stabilization on locations of the key points in the first set according to locations of the key points in the second set, to obtain current locations of a set of key points of the target object in the current video frame.

According to another aspect of the embodiments of the present disclosure, an image processing method is further provided. The method includes: detecting a target object in a current video frame of a target video stream, to obtain a current detection region for the target object; obtaining a determined current detection region according to a historic detection region corresponding to the target object in a historic video frame of the target video stream and the current detection region; performing key point positioning on the target object based on the determined current detection region, to obtain a first set of key points; performing stabilization on locations of the key points in the first set according to locations of the key points in a second set corresponding to the target object in the historic video frame, to obtain current locations of a set of key points of the target object in the current video frame; recognizing a part of the target object from the current video frame according to the current locations of the set of key points of the target object; performing adjustment on the recognized part of the target object; and displaying an image of the target object after the adjustment.

According to another aspect of the embodiments of the present disclosure, an object key point positioning apparatus is further provided. The object key point positioning apparatus is also referred as an image processing apparatus. The apparatus includes: a detection unit, configured to detect a target object in a current video frame of a target video stream, to obtain a current detection region for the target object; a first obtaining unit, configured to obtain a historic detection region corresponding to the target object in a historic video frame of the target video stream; a second obtaining unit, configured to obtain a determined current detection region according to the historic detection region and the current detection region; a positioning unit, configured to perform key point positioning on the target object based on the determined current detection region, to obtain a first set of key points; a third obtaining unit, configured to obtain a second set of key points corresponding to the target object in the historic video frame of the target video stream; and an adjustment unit, configured to perform stabilization on locations of the key points in the first set according to locations of the key points in the second set, to obtain current locations of a set of key points of the target object in the current video frame.

According to another aspect of the embodiments of the present disclosure, an image processing apparatus is further provided. The apparatus includes: a detection unit, configured to detect a target object in a current video frame of a target video stream, to obtain a current detection region for the target object; an obtaining unit, configured to obtain a determined current detection region according to a historic detection region corresponding to the target object in a historic video frame of the target video stream and the current detection region; a positioning unit, configured to perform key point positioning on the target object based on the determined current detection region, to obtain a first set of key points; a first adjustment unit, configured to perform stabilization on locations of the key points in the first set according to locations of the key points in a second set corresponding to the target object in the historic video frame, to obtain current locations of a set of key points of the target object in the current video frame; a recognition unit, configured to recognize a part of the target object from the current video frame according to the current locations of the set of key points of the target object; a second adjustment unit, configured to perform adjustment on the recognized part of the target object; and a display unit, configured to display an image of the target object after the adjustment.

According to another aspect of the embodiments of the present disclosure, a non-transitory storage medium is further provided. The storage medium stores a computer program, the computer program being configured to perform, when being run, the object key point positioning method according to the embodiments of the present disclosure.

In the embodiments of the present disclosure, a current detection region for a target object is detected from a current video frame of a target video stream, a determined current detection region is obtained according to a historic detection region corresponding to the target object in a historic video frame and the current detection region, key point positioning is performed on the target object based on the determined current detection region, to obtain a first set of key points, and stabilization is performed on locations of the key points in the first set according to locations of the key points in a second set corresponding to the target object in the historic video frame of the target video stream, to obtain current locations of a set of key points of the target object in the current video frame, so that object key points are stabilized, and a jitter of the object key points between video frames is avoided, thereby achieving the technical effect of improving the accuracy of positioning the object key points, and further resolving the technical problem of low accuracy of detecting the object key points in the related art.

BRIEF DESCRIPTION OF THE DRAWINGS

The accompanying drawings described herein are used for providing further understanding of the present disclosure, and form a part of the present disclosure. Exemplary embodiments of the present disclosure and descriptions thereof are used to explain the present disclosure, and do not constitute any inappropriate limitation to the present disclosure. In the accompanying drawings.

DESCRIPTION OF EMBODIMENTS

To make solutions in the present disclosure more comprehensible for a person skilled in the art, the technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The terms such as "first" and "second" in the specification, the claims and the foregoing accompanying drawings of the present disclosure are intended to distinguish between similar objects, but are not necessarily used for describing a specific sequence or a chronological order. It is to be understood that the data termed in such a way are interchangeable in proper circumstances, so that the embodiments of the present disclosure described herein can be implemented in orders other than the order illustrated or described herein. Moreover, the terms "include", "contain" and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
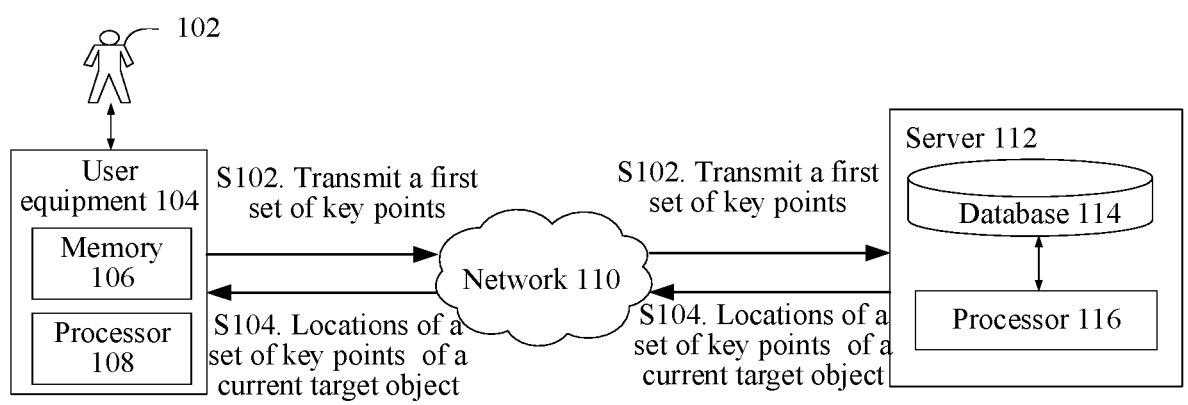
FIG. 1 is a schematic diagram of a hardware environment of an object key point positioning method according to an embodiment of the present disclosure.

According to an aspect of the embodiments of the present disclosure, an object key point positioning method is provided. Optionally, the object key point positioning method may be applied to, but is not limited to, an environment shown in FIG. 1. FIG. 1 is a schematic diagram of a hardware environment of an object key point positioning method according to an embodiment of the present disclosure. As shown in FIG. 1, a user 102 may exchange data with user equipment 104, and the user equipment 104 may include, but is not limited to, a memory 106 and a processor 108. The user equipment 104 may determine a to-be-processed target object in a target video, detect the target object in a current video frame of a target video stream by using the processor 108, to obtain a current detection region for the target object, obtain a determined current detection region according to a historic detection region corresponding to the target object in a historic video frame of the target video stream and the current detection region, perform key point positioning on the target object based on the determined current detection region, to obtain a first set of key points, and perform step S102 to transmit the first set of key points to a server 112 by using a network 110.

The server 112 includes a database 114 and a processor 116. After the server 112 obtains the first set of key points, the processor 116 obtains locations of the key points in a second set corresponding to the target object in the historic video frame of the target video stream from the database 114, performs stabilization on locations of the key points in the first set according to the locations of the key points in the second set, to obtain current locations of a set of key points of the target object in the current video frame, and finally performs step S104 to return the current locations of the set of key points of the target object to the user equipment 104 by using the network 110.

The foregoing description is merely an example of the hardware environment of the object key point positioning method according to the embodiments of the present disclosure, and the hardware environment in the embodiments of the present disclosure is not merely limited thereto. For example, the object key point positioning method may alternatively be performed by using only a client, which is not described one by one by using an example.

In the related art, for object key point positioning in a single PS image, a user or a designer needs to determine object key points of a human body by using naked eyes, which is time-consuming and labor-consuming. In addition, in a video application, an image region in which an object is located is usually stretched as a whole. Even though the object key points are positioned, the accuracy of positioning the object key points is low when a jitter occurs between previous and subsequent video frames in a video.

Figure 2:
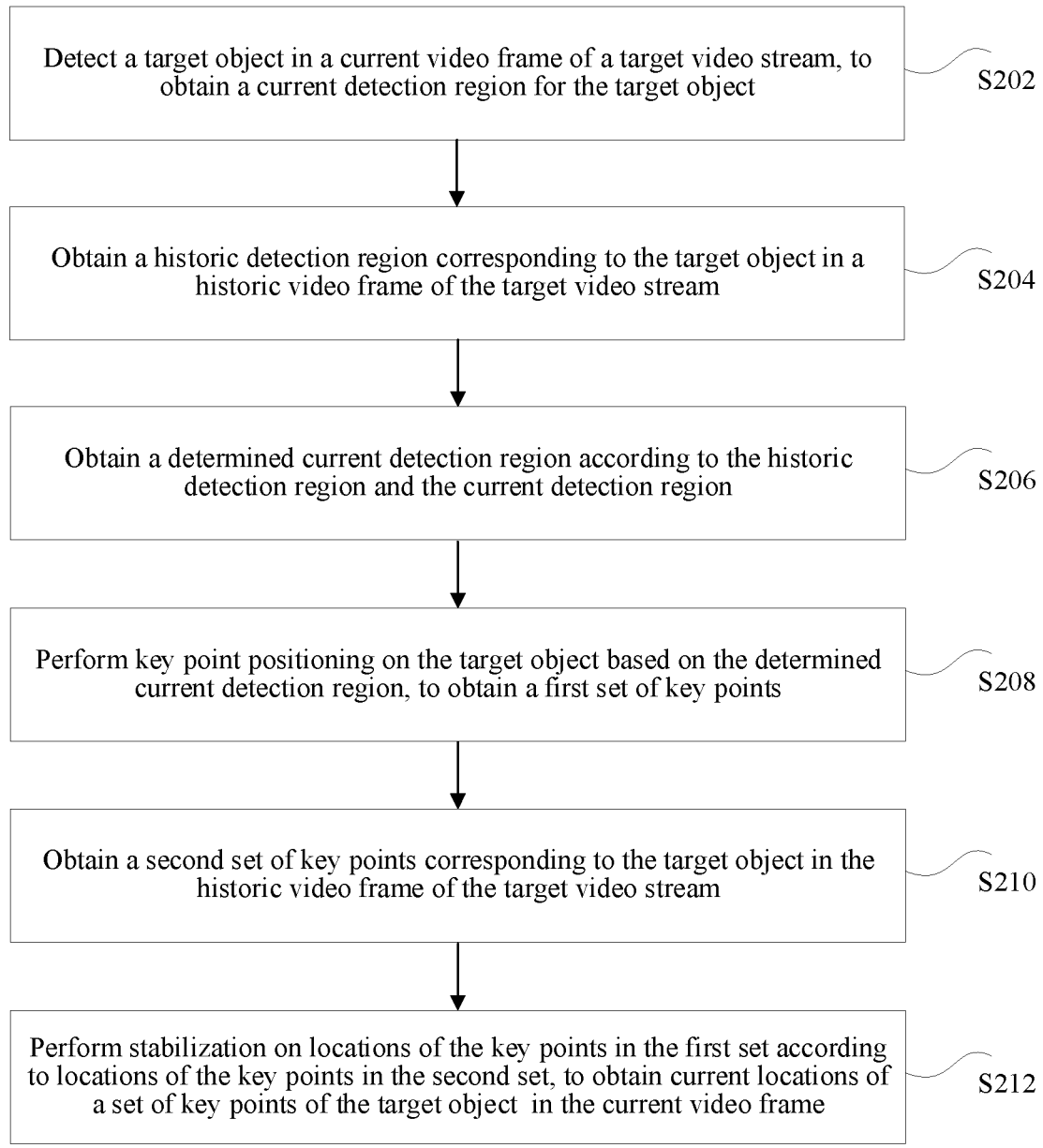
FIG. 2 is a flowchart of an object key point positioning method according to an embodiment of the present disclosure.

FIG. 2 is a flowchart of an object key point positioning method according to an embodiment of the present disclosure. As shown in FIG. 2, the method may include the following steps:

Step S202. Detect a target object in a current video frame of a target video stream, to obtain a current detection region for the target object.

The target video stream may be a video stream of any type of video in a video application, for example, may be a video stream of a short video. The target object in the current video frame of the target video stream is located in a target scenario displayed in the current video frame. The target object may be an object on which key point positioning is to be performed, such as a human body or an animal. The target scenario may be a video scenario such as a selfie scenario or a dancing scenario. In some embodiments of the present disclosure, neither a specific video scenario nor an object type of the target object is not limited.

The so-called current detection region is a region in which the target object is located in the target scenario displayed in the current video frame, and the region includes a location and a range. During specific representation, the current detection region may be represented as an object detection box. When the target object is a human body, the object detection box is specifically a human body detection box. More specifically, the object detection box may be represented as a detection box of any shape such as a rectangular box, an elliptic box, or a hexagonal box. These detection boxes are used for marking a location and a range of the target object in the target scenario. Using a rectangular box as an example, a location annotated by the rectangular box may be understood as coordinates at the upper left corner of the region, and a range annotated by the rectangular box may be understood as a length and a width of the region. The region enclosed by the rectangular box is the region in which the target object is located in the target scenario.

Optionally, in some embodiments, the target object is detected by using a detection model that is trained based on a deep neural network. The detection model may be a network model that is trained based on an open-source single shot multibox detector (SSD for short) architecture. When the target object is detected by using the detection model, the current video frame may be inputted into the detection model, to produce a plurality of candidate detection boxes and confidence levels of the plurality of candidate detection boxes, from which three candidate detection boxes with maximum confidence levels, such as a first candidate detection box, a second candidate detection box, and a third candidate detection box, are selected. Verification is respectively performed between the first candidate detection box and a historic detection region of a historic video frame adjacent to the current video frame in the target video stream, between the second candidate detection box and the historic detection region, and between the third candidate detection box and the historic detection region. A candidate detection box having a maximum intersection over union with the historic detection region may be selected from the first candidate detection box, the second candidate detection box, and the third candidate detection box as the current detection region of the current video frame, thereby ensuring that the same target object is positioned at every moment.

Step S204. Obtain a historic detection region corresponding to the target object in a historic video frame of the target video stream.

The so-called historic video frame is a historic video frame relative to the current video frame. That is, the historic video frame is a video frame within a preset time range before the current video frame in the target video stream.

The so-called historic detection region may be a stabilized detection region corresponding to the target object in the historic video frame. Specific location information of the historic detection region is a historic detection result, and the historic detection result is buffered in a first predetermined storage location. During specific implementation, the historic video frame corresponding to the current video frame may be understood as one or more previous video frames adjacent to the current video frame in chronological order. Historic detection regions corresponding to the historic video frames are stabilized detection regions corresponding to the target object in the historic video frames, and the historic detection regions are sequentially stored in sub-locations of the first predetermined storage location according to a sequence of frame numbers of the detected historic video frames. After obtaining the current detection region for the target object, the historic detection region related to the current detection region may be obtained from the first predetermined storage location.

Step S206. Obtain a determined current detection region according to the historic detection region and the current detection region.

The current detection region decides inputs of a key point detection network, and the stability of a background in which the target object is located in the region also affects the stability of object key points in a time sequence. Therefore, a box stabilization mechanism is used to make backgrounds of the inputs of the key point detection network in previous and subsequent frames partially stable in time and frequency domain. Therefore, in some embodiments, after the current detection region for the target object is obtained, the current detection region needs to be adjusted, for example, performing stabilization on the current detection region. The current detection region may be adjusted by using the historic detection region, to obtain a determined current detection region. Such adjustment makes a region change value between the determined current detection region and the historic detection region less than a first target threshold. That is, regions indicated by the determined current detection region and the historic detection region are unchanged or have a small change in mostly partial time domain.

The first target threshold is used for measuring a critical value of a region change value. The region change value may be determined by using a change value between a coordinate value of the region indicated by the determined current detection region and a coordinate value of the region indicated by the historic detection region.

Optionally, after the determined current detection region is obtained according to the historic detection region and the current detection region, an original curve that is used for indicating a location change of an object detection region is converted to a ladder trajectory, thereby detecting an object key point set of the target object according to the determined current detection region.

In some embodiments, stabilization is performed on the current detection region, so that regions in which the target object is located in the current video frame and historic video frames adjacent to the current video frame are partially stable in time domain. Therefore, a stable background is provided for detection of a plurality of object key points of the target object, thereby reducing errors of detecting the object key points caused due to a background change, and ensuring the accuracy of the finally outputted object key points.

After the determined current detection region is obtained, the determined current detection region may be stored in the first predetermined storage location as a historic detection region corresponding to another subsequent video frame, so that the determined current detection region is used as basic data for participating in performing stabilization on a detection region of the target object in the another subsequent video frame.

Step S208. Perform key point positioning on the target object based on the determined current detection region, to obtain a first set of key points.

The first set of key points includes a plurality of object key points. The plurality of object key points are used for identifying feature points of an object key part, to annotate an object contour.

Different objects correspond to different key points. Therefore, before the solution is implemented, object key points need to be first defined. For example, when the target object is a human body, the object key points are human body key points, which may be specifically defined as human body key points used for indicating a human body part such as a left ear, a left eye, or a nose. The plurality of human body key points may be respectively located on a location of the indicated part. Optionally, in actual scenarios, the motion of an object is extremely complicated, and "leftward", "rightward", "inward", and "outward" motions are difficult to be distinguished. A side first appearing on the object from left to right may be defined as the left side of the object, and a side first appearing on the object from right to left may be defined as the right side of the object. Optionally, when the target object is a human body, a shoulder first appearing from left to right is the left shoulder, and a thigh first appearing from left to right is the left thigh. The plurality of object key points are defined, thereby avoiding the ambiguity in definitions of the plurality of object key points.

Optionally, in some embodiments, key point positioning is performed on the target object based on the determined current detection region by using a key point detection algorithm, to obtain the first set of key points, key point positioning may be performed on each key point of the target object based on the determined current detection region, to obtain the first set of key points, and the first set of key points may be a set of key points of a human body, including 66 human body key points. The key point detection algorithm may be obtained based on a feature pyramid network (FPN for short) in a deep learning model.

Step S210. Obtain a second set of key points corresponding to the target object in the historic video frame of the target video stream.

In some embodiments, the second set of key points is an object key point set corresponding to the target object in the historic video frame relative to the current video frame. A plurality of object key points included in the second set of key points are in a one-to-one correspondence with a plurality of object key points included in the first set of key points. The second set of key points is obtained by performing key point positioning on the target object in the historic video frame of the target video stream before the current detection region for the target object is obtained, that is, a historic detection result obtained by performing key point positioning on the target object.

In some embodiments, the second set of key points may be a stabilized object key point set corresponding to the target object in the historic video frame adjacent to the current video frame, and is stored in a second predetermined storage location. The second predetermined storage location may be the same as the first predetermined storage location. Stabilized object key point sets corresponding to the target object in historic video frames are sequentially stored in sub-locations of the second predetermined storage location according to a sequence of frame numbers of the historic video frames.

Step S212. Perform stabilization on locations of the key points in the first set according to locations of the key points in the second set, to obtain current locations of a set of key points of the target object in the current video frame.

In the technical solution provided in step S212 in the present disclosure, locations of the key points in the second set is a detection result that has been detected for the target object in the historic video frame. The locations of the key points in the second set may be represented by using coordinates of the second set of key points on the target object.

In some embodiments, due to existence of a prediction error, a jitter exists in point locations in the target video stream. After the locations of the key points in the second set is obtained, stabilization is performed on locations of the key points in the first set according to the locations of the key points in the second set, to obtain current locations of a set of key points of the target object in the current video frame. The locations of the key points in the first set may be represented by using coordinates of the first set of key points on the target object, and the current locations of the set of key points of the target object may be represented by using coordinates of the current target object key point set on the target object.

In some embodiments, a location change amplitude between the current locations of the set of key points of the target object in the current video frame and the locations of the key points in the second set of the target object in the historic video frame adjacent to the current video frame is less than a second target threshold. The second target threshold is used for measuring a critical value of a location change amplitude between the first set of key points and the second set of key points. That is, a jitter amplitude between a key point set of the target object in the current video frame and a key point set of the target object in the historic video frame is reduced.

After stabilization is performed on the locations of the key points in the first set according to the locations of the key points in the second set, to obtain the current locations of the set of key points of the target object in the current video frame, the current target object key point set may be stored in a second predetermined storage location. The second predetermined storage location may be the same as the first predetermined storage location, to be used for performing stabilization on locations of a set of key points of an object in a video frame after the current video frame. That is, the current target object key point set is used as a basis of performing stabilization on the locations of the set of key points of the object in the video frame after the current video frame, and once determined, the current target object key point set is stored in the second predetermined storage location. For example, when the current video frame is the third video frame of the target video stream, the current target object key point set is stored in a third sub-location of the second predetermined storage location. The third sub-location of the second predetermined storage location may be adjacent to a second sub-location of the second predetermined storage location, to be used for performing stabilization on locations of a set of key points of an object of the fourth video frame (the fifth video frame or the sixth video frame).

When the current video frame becomes a historic video frame of a video frame after the current video frame in the target video stream, the current target object key point set also becomes a second set of key points corresponding to the target object in the historic video frame. For example, when the current video frame is a third video frame of the target video stream, the current target object key point set is a second set of key points corresponding to the target object in a historic video frame of the fourth video frame (the fifth video frame or the sixth video frame) in the target video stream.

In an optional implementation, step S206 of obtaining a determined current detection region according to the historic detection region and the current detection region includes: obtaining the determined current detection region according to the historic detection region and the current detection region when the historic video frame is a historic video frame adjacent to the current video frame.

In some embodiments, when the determined current detection region is obtained according to the historic detection region and the current detection region, a historic detection region in a historic video frame adjacent to the current video frame may be obtained, and the current detection region is adjusted by using the historic detection region, so that a region change value between a region indicated by the determined current detection region and a region indicated by the historic detection region is less than a predetermined threshold, and further regions indicated by the determined current detection region and the historic detection region are unchanged or have a small change in mostly partial time domain.

In an optional implementation, when the historic video frame is a historic video frame adjacent to the current video frame, the obtaining a determined current detection region according to the historic detection region and the current detection region includes: obtaining an intersection over union between the historic detection region and the current detection region when the historic video frame is a historic video frame adjacent to the current video frame; using the historic detection region as the determined current detection region when the intersection over union is greater than a target threshold; and directly using the current detection region as the determined current detection region when the intersection over union is not less than the target threshold.

In some embodiments, after the target object in the current video frame of the target video stream is detected, to obtain the current detection region for the target object, stabilization, that is, box stabilization, is performed on the current detection region. Stabilization may be performed on the current detection region by using a result obtained by detecting the target object in a historic video frame adjacent to the current video frame.

Optionally, for a historic video frame adjacent to the current video frame, a historic detection region used for indicating a region in which the target object is located in a target scenario displayed in an image of the historic video frame is obtained, and then an intersection over union between the current detection region and the historic detection region is obtained. That is, an intersection over union between a region A that is indicated by the current detection region and in which the target object is located in a target scenario displayed in an image of the current video frame and a region B that is indicated by the historic detection region and in which the target object is located in the target scenario displayed in the image of the historic video frame is obtained.

Optionally, an intersection over union (IOU) is obtained by calculating a ratio of an area of an intersection between the region A and the region B to an area of a union between the region A and the region B.

$$IOU(A, B) = \frac{\text{Area}(A \cap B)}{\text{Area}(A \cup B)}$$

After the intersection over union between the current detection region and the historic detection region is obtained, whether the intersection over union is greater than a target threshold is determined. The target threshold is used for measuring an overlapping rate between the current detection region and the historic detection region, which may be 0.4. When the intersection over union between the current detection region and the historic detection region is greater than a second target threshold, it is determined that a region in which the current detection region overlaps the historic detection region is relatively large, and the historic detection region is determined as a detection region obtained after stabilization is performed on the current detection region. That is, a historic detection region of a previous historic video frame of the current video frame continues to be used as the detection region obtained after stabilization is performed on the current detection region, thereby implementing that backgrounds of previous and subsequent video frames are partially stable in time domain, to improve the accuracy of detection of object key points of the target object.

When the intersection over union is not less than the target threshold, the current detection region may be directly used as the determined current detection region, that is, stabilization may not be performed on the current detection region.

Optionally, stabilization may not need to be performed on the first video frame in the target video stream.

In another optional example, the current detection region and the historic detection region may be rectangular boxes, and have determined locations in the target scenario. Before the determined current detection region is obtained according to the historic detection region and the current detection region, a first size of the current detection region, a first location of the current detection region in the target scenario, a second size of the historic detection region, and a second location of the historic detection region in the target scenario may be obtained. The first size and the second size may be represented by using areas, and the first location and the second location may be represented by using coordinate values in the target scenario.

After the first size of the current detection region and the second size of the historic detection region are obtained, a size change value between the first size and the second size is obtained, and whether the size change value is less than a first predetermined threshold is determined. The first predetermined threshold is used for measuring a critical value of the change value between the first size and the second size. After the first location of the current detection region in the target scenario and the second location of the historic detection region in the target scenario are obtained, a location change value between the first location and the second location is obtained, and whether the location change value is less than a second predetermined threshold is determined. The second predetermined threshold is used for measuring a critical value of the change value between the first location and the second location. If it is determined that the size change value is less than the first predetermined threshold, and the location change value is less the second predetermined threshold, the historic detection region is determined as the current detection region, thereby ensuring that sizes and locations of human body detection boxes associated with the target object have a small change or are unchanged in mostly partial time domain, to improve the accuracy of detection of the object key points of the target object, and further improve the efficiency of processing the target object.

In an optional implementation, step S212 of performing stabilization on locations of the key points in the first set according to locations of the key points in the second set, to obtain current locations of a set of key points of the target object in the current video frame includes: determining the locations of the key points in the second set as the current locations of the set of key points of the target object when the historic video frame is a historic video frame adjacent to the current video frame; or performing, when the historic video frame is a plurality of historic video frames adjacent to the current video frame, stabilization on the locations of the key points in the first set according to locations of a plurality of second set of key points, to obtain the current locations of the set of key points of the target object, the plurality of historic video frames being in a one-to-one correspondence with the plurality of second set of key points.

In some embodiments, the historic video frame may be a historic video frame adjacent to the current video frame. The locations of the key points in the second set corresponding to the target object in the historic video frame is a detection result that has been detected for the object key points in the historic video frame, and the locations of the key points in the second set is directly determined as the current locations of the set of key points of the target object. That is, locations of a plurality of object key points in the second set of key points are directly used as locations of a plurality of object key points in the current target object key point set.

Optionally, the historic video frame may be a plurality of historic video frames adjacent to the current video frame. For example, when the current video frame is the third video frame of the target video stream, the historic video frames are the first video frame and the second video frame of the target video stream. Each historic video frame corresponds to one second set of key points. The one second set of key points may include all key points on the target object. For example, if the target object is a human body, the one second set of key points may include 66 human body key points. Stabilization is performed on the locations of the key points in the first set by using the locations of the plurality of second set of key points, and stabilization may be performed on a plurality of corresponding object key points included in the first set of key points according to locations of a plurality of object key points included in each second set of key points, to obtain the current locations of the set of key points of the target object.

Figure 3:
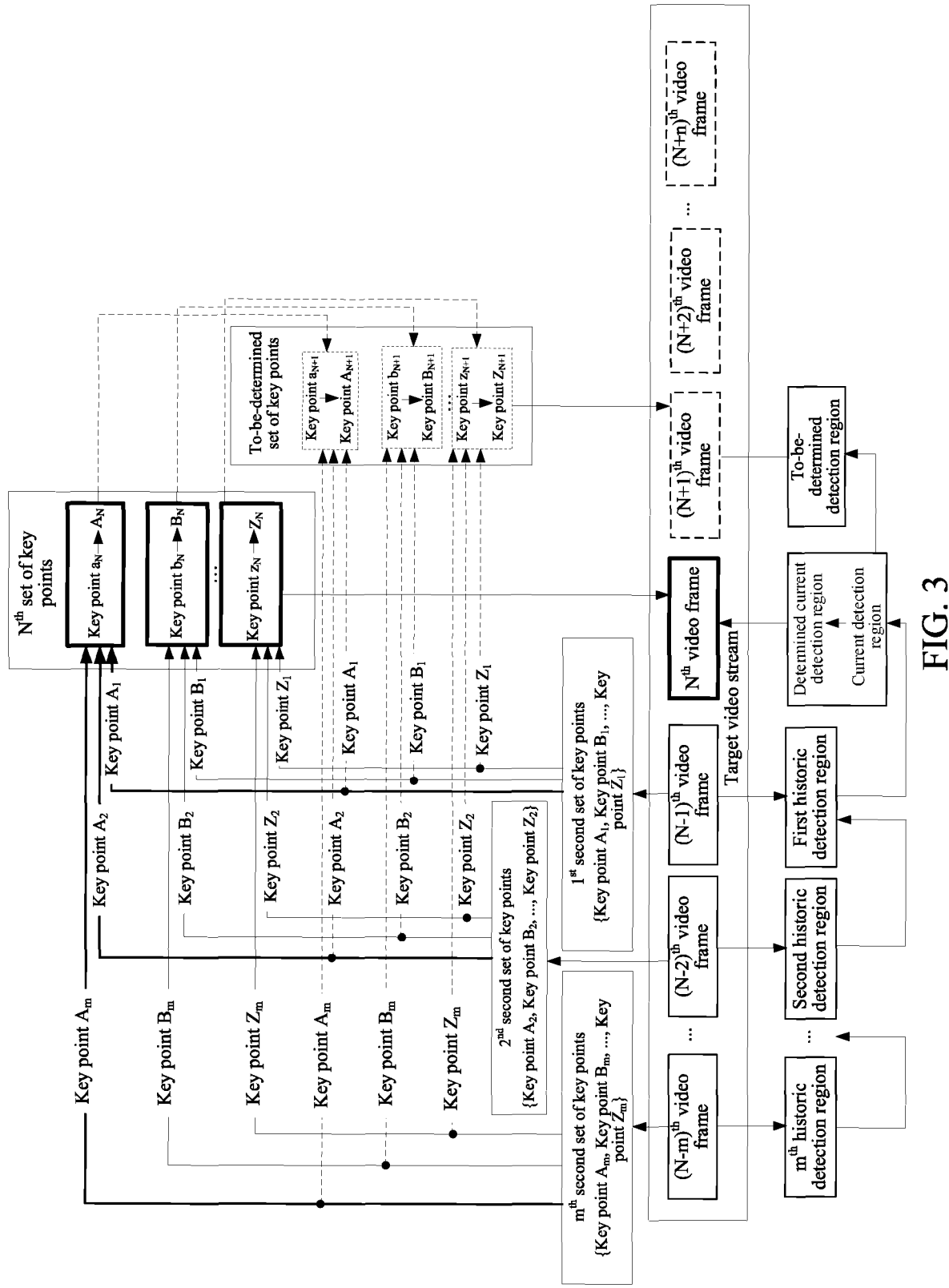
FIG. 3 is a schematic diagram of performing stabilization on a current detection region of a current video frame and performing stabilization on a key point set of a target object in the current video frame according to an embodiment of the present disclosure.

FIG. 3 is a schematic diagram of performing stabilization on a current detection region of a current video frame and performing stabilization on a key point set of a target object in the current video frame according to an embodiment of the present disclosure. As shown in FIG. 3, the target video stream includes the $N^{th}$ video frame, the $(N-1)^{th}$ video frame, the $(N-2)^{th}$ video frame, . . . , the $(N-m)^{th}$ video frame, the $(N+1)^{th}$ video frame, the $(N+2)^{th}$ video frame, . . . , and the $(N+n)^{th}$ video frame. The $N^{th}$ video frame is the current video frame of the target video stream, the $(N-1)^{th}$ video frame, the $(N-2)^{th}$ video frame, . . . , and the $(N-m)^{th}$ video frame are a plurality of historic video frames adjacent to the current video frame in the target video stream, and the $(N+1)^{th}$ video frame, the $(N+2)^{th}$ video frame, . . . , and the $(N+n)^{th}$ video frame are a plurality of video frames after the current video frame in the target video stream, where N is a natural number greater than or equal to 1, 1≤m≤N, m is a natural number, and n is a natural number greater than or equal to 1.

Optionally, the $(N-1)^{th}$ video frame in some embodiments may be a first historic video frame of the current video frame, and corresponds to a $1^{st}$ second set of key points {key point $A_1$, key point $B_1$, . . . , key point $Z_1$} and a first historic detection region. The $(N-2)^{th}$ video frame may be a second historic video frame of the current video frame, and corresponds to a $2^{nd}$ second set of key points {key point $A_2$, key point $B_2$, . . . , key point $Z_2$} and a second historic detection region. The $(N-m)^{th}$ video frame may be an $m^{th}$ historic video frame of the current video frame, and corresponds to an $m^{th}$ second set of key points {key point $A_m$, key point $B_m$, . . . , key point $Z_m$} and an $m^{th}$ historic detection region. The $N^{th}$ video frame is the current video frame, and corresponds to the first set of key points {key point $a_N$, key point $b_N$, . . . , key point $z_N$}. The $1^{st}$ second set of key points, the $2^{nd}$ second set of key points, . . . , and the $m^{th}$ second set of key points are stored in a second predetermined storage location.

In some embodiments, after the target object in the $N^{th}$ video frame of the target video stream is detected, to obtain the current detection region for the target object, a determined current detection region may be obtained according to the first historic detection region and the current detection region, that is, a determined current detection region is obtained by performing stabilization on the current detection region according to the first historic detection region. Optionally, the first historic detection region is used as the determined current detection region when an intersection over union between the first historic detection region and the current detection region is greater than a target threshold; and the current detection region is directly used as the determined current detection region when the intersection over union is not less than the target threshold. In some embodiments, the first historic detection region may be determined by using the second historic detection region, the second historic detection region may be determined by using a historic detection region corresponding to the target object in the $(N-3)^{th}$ video frame, and the rest may be deduced by analogy. Optionally, stabilization does not need to be performed on a detection region in the first video frame of the target video stream.

After the determined current detection region is obtained according to the first historic detection region and the current detection region, the determined current detection region may be stored in a first predetermined storage location, and may become a historic detection region of a detection region corresponding to the target object in the $(N+1)^{th}$ video frame, to be used for performing stabilization on the detection region corresponding to the target object in the $(N+1)^{th}$ video frame.

Analogy may be further performed by using the foregoing method, to perform stabilization on detection regions corresponding to the target object in the $(N+2)^{th}$ video frame and the $(N+3)^{th}$ video frame.

In some embodiments, stabilization may be further performed on a plurality of corresponding object key points included in the first set of key points by using locations of a plurality of object key points included in each second set of key points. For example, stabilization is performed on a location of the key point $a_N$ in the first set of key points by using a location of the key point $A_1$ in the $1^{st}$ second set of key points, a location of the key point $A_2$ in the $2^{nd}$ second set of key points, . . . , and a location of the key point $A_m$ in the $m^{th}$ second set of key points, to obtain a location of the key point $A_N$ in the current target object key point set. Stabilization is performed on a location of the key point $b_N$ in the first set of key points by using a location of the key point $B_1$ in the $1^{st}$ second set of key points, a location of the key point $B_2$ in the $2^{nd}$ second set of key points, . . . , and a location of the key point $B_m$ in the $m^{th}$ second set of key points, to obtain a location of the key point $B_N$ in the current target object key point set. Stabilization is performed on a location of the key point $z_N$ in the first set of key points by using a location of the key point $Z_1$ in the $1^{st}$ second set of key points, a location of the key point $Z_2$ in the $2^{nd}$ second set of key points, . . . , and a location of the key point $Z_m$ in the $m^{th}$ second set of key points, to obtain a location of the key point ZN in the current target object key point set. Therefore, stabilization is performed on the plurality of corresponding object key points included in the first set of key points by using the locations of the plurality of object key points included in the each second set of key points, to obtain an $N^{th}$ current target object key point set {key point $A_N$, key point $B_N$, . . . , key point $Z_N$}.

Optionally, after the $N^{th}$ current target object key point set {key point $A_N$, key point $B_N$, . . . , key point $Z_N$} is obtained, the current target object key point set is stored in a second predetermined storage location, to be used for performing stabilization on locations of a set of key points of an object in a video frame after the current video frame. The second predetermined storage location may be the same as the first predetermined storage location. For example, stabilization is performed on locations of a set of key points of an object of the $(N+1)^{th}$ video frame.

Optionally, stabilization is performed on a location of a key point $a_{N+1}$ in the object key point set of the $(N+1)^{th}$ video frame by using a location of the key point $A_N$ in the current target object key point set, the location of the key point $A_1$ in the $1^{st}$ second set of key points, the location of the key point $A_2$ in the $2^{nd}$ second set of key points, . . . , and the location of the key point $A_m$ in the $m^{th}$ second set of key points, to obtain a location of a key point $A_{N+1}$. Stabilization is performed on a location of a key point $b_{N+1}$ in the object key point set of the $(N+1)^{th}$ video frame by using a location of the key point $B_N$ in the current target object key point set, the location of the key point $B_1$ in the $1^{st}$ second set of key points, the location of the key point $B_2$ in the $2^{nd}$ second set of key points, . . . , and the location of the key point $B_m$ in the $m^{th}$ second set of key points, to obtain a location of a key point $B_{N+1}$. Stabilization is performed on a location of a key point $z_{N+1}$ in the object key point set of the $(N+1)^{th}$ video frame by using a location of the key point ZN in the current target object key point set, the location of the key point $Z_1$ in the $1^{st}$ second set of key points, the location of the key point $Z_2$ in the $2^{nd}$ second set of key points, . . . , and the location of the key point $Z_m$ in the $m^{th}$ second set of key points, to obtain a location of a key point $Z_{N+1}$. Therefore, an $(N+1)^{th}$ current target object key point set {key point $A_{N+1}$, key point $B_{N+1}$, . . . , key point $Z_{N+1}$} is obtained based on the $N^{th}$ current target object key point set {key point $A_N$, key point $B_N$, . . . , key point ZN}.

Analogy may be further performed by using the foregoing method, to perform stabilization on locations of object key point sets corresponding to the target object in the $(N+2)^{th}$ video frame and the $(N+3)^{th}$ video frame.

In an optional implementation, the performing stabilization on the locations of the key points in the first set according to locations of a plurality of second set of key points, to obtain the current locations of the set of key points of the target object in the current video frame includes: determining locations of first target object key points that are to be stabilized from the first set of key points; determining locations of second target object key points corresponding to the first target object key points from each second set of key points, to obtain locations of a plurality of second target object key points, a part of the target object indicated by the second target object key points being the same as a part of the target object indicated by the first target object key points; obtaining a weighted sum of the locations of the plurality of second target object key points; determining a target coefficient by using a frame rate of the target video stream; and performing smoothing on the locations of the first target object key points according to the weighted sum and the target coefficient, to obtain stabilized locations of the first target object key points.

The historic video frame in some embodiments may be a plurality of historic video frames adjacent to the current video frame, and stabilization may be performed on locations of a plurality of key points included in the first set of key points one by one according to locations of a plurality of second set of key points corresponding to the plurality of historic video frames, to obtain the current locations of the set of key points of the target object in the current video frame. Optionally, the first set of key points includes a plurality of object key points, from which locations of first target object key points that are to be stabilized are determined, and then locations of second target object key points corresponding to the first target object key points are determined from each second set of key points, to obtain locations of a plurality of second target object key points. A part of the target object indicated by the second target object key points is the same as a part of the target object indicated by the first target object key points. For example, both the first target object key points and the second target object key points indicate an eye part of a target human body.

In some embodiments, stabilization is performed on the first target object key points according to a detection result of the plurality of second target object key points, so that temporal-spatial filtering stabilization may be performed on the first target object key points according to the detection result of the plurality of second target object key points. Optionally, first locations of the plurality of second target object key points on the target object are respectively obtained, to obtain a plurality of first locations, such as $\{p_{t-i}\}_{i=0:w}$, where t is used for indicating the current video frame, and w is used for indicating a quantity of historic video frames. After the plurality of first locations are obtained, a weighted sum of the plurality of first locations is obtained. For example, a weighting operation is performed on $\{p_{t-i}\}_{i=0:w}$, to obtain a weighted sum $\Sigma_{i=0}^{w} p_{t-i}$. A target coefficient is determined by using a frame rate of the target video stream. For example, values of target coefficients $c_1$ and $c_2$ are determined by using the frame rate of the target video stream. Smoothing is performed on the locations of the first target object key points on the target object according to the weighted sum and the target coefficient, to obtain stabilized locations $p_t'$ of the first target object key points. For example, smoothing is performed on the locations of the first target object key points on the target object according to the weighted sum $\Sigma_{i=0}^{w} p_{t-i}$ and the target coefficients $c_1$ and $c_2$, to obtain stabilized locations $p_t'$ of the first target object key points:

$$p_t = \frac{1}{\sum_{i=0}^{w} e^{-c_1(p_{t-i}-p_t)^2} e^{-c_2 i^2}} \sum_{i=0}^{w} p_{t-i} e^{-c_1(p_{t-i}-p_t)^2} \cdot e^{-c_2 i^2}$$

where a time factor is considered in $e^{-c_2 i^2}$ and $e^{-c_1(P_{t-i}-P_t)^2}$, and w is used for indicating a quantity of historic video frames, that is, a size of a window of temporal-spatial filtering.

A change amplitude between the stabilized locations of the first target object key points that are obtained by performing smoothing on the locations of the first target object key points on the target object according to the weighted sum and the target coefficient and the locations of the second target object key points on the target object in a historic video frame adjacent to the current video frame is less than a second target threshold, thereby implementing stabilization on the first target object key points.

Optionally, in some embodiments, stabilization may be further performed on object key points other than the first target object key points in the plurality of object key points by using the foregoing method, to obtain a plurality of stabilized object key points, and ensure that the plurality of object key points on the target object are stable in a video sequence. Therefore, a prediction error of object key points is eliminated, stronger temporal-spatial consistency is shown in previous and subsequent video frames, a jitter is reduced, and the accuracy of positioning the object key points is improved.

In another optional implementation, step S202 of detecting a target object in a current video frame of a target video stream, to obtain a current detection region for the target object includes: detecting the current video frame, to obtain a plurality of first candidate detection regions; and determining a first candidate detection region having a maximum intersection over union with the historic detection region in the plurality of first candidate detection regions as the current detection region.

In some embodiments, a plurality of target video frames, a plurality of detection regions of the target object, and confidence levels of the plurality of detection regions of the target object are used as data for training a first target sub-model. The plurality of target video frames are input data of the first target sub-model. The plurality of detection regions of the target object and the confidence levels of the plurality of detection regions of the target object are output data of the first target sub-model. Each detection region of the target object may be a region in which the target object is located in a target scenario displayed in an image of each target video frame in a target video. The first target sub-model is trained based on a deep neural network by using the foregoing data, to obtain a first target model. The first target model is used for detecting video frames included in the target video, to obtain a plurality of detection regions of an object and confidence levels of the plurality of detection regions of the object. The first target sub-model in some embodiments may be a detection model initially established based on the deep neural network.

Optionally, the first target model in some embodiments is a network model (MobileNetV1) that is trained based on an open-source SSD architecture, and a quantity of channels of the network model may be reduced to ¼ of the original quantity according to a requirement on a mobile side, thereby facilitating deployment and acceleration of the model.

In a detection algorithm of an object detection region in some embodiments, the current video frame may be detected by using the first target model, to obtain a plurality of first candidate detection regions and confidence levels of the plurality of first candidate detection regions. The confidence levels of the first candidate detection regions are used for indicating probabilities that the first candidate detection regions are determined as the current detection region. A first candidate detection region having a maximum intersection over union with the historic detection region is selected from the plurality of first candidate detection regions, and the first candidate detection region having the maximum intersection over union is determined as the current detection region. Optionally, the historic detection region in some embodiments may be a plurality of historic detection regions corresponding to the target object in a plurality of historic video frames adjacent to the current video frame, and a first candidate detection region that overlaps with at least two of the plurality of historic detection regions and that has a maximum intersection over union is selected from the plurality of first candidate detection regions.

In another optional implementation, the determining a first candidate detection region having a maximum intersection over union with the historic detection region in the plurality of first candidate detection regions as the current detection region includes: determining the first candidate detection region having the maximum intersection over union with the historic detection region in the plurality of first candidate detection regions as the current detection region when the historic video frame is a historic video frame adjacent to the current video frame.

In some embodiments, when the current detection region is determined, a historic detection region corresponding to the target object in a historic video frame adjacent to the current video frame may be used as a reference object, and a first candidate detection region having a maximum intersection over union with the historic detection region in the plurality of first candidate detection regions is determined as the current detection region.

For example, a historic detection region A corresponding to the target object in a historic video frame adjacent to the current video frame is used as a reference object. A size of an image in the current video frame is adjusted to 300×300 to be used as an input of the network model, and generate 1000 first candidate detection regions, and a first candidate detection region having a maximum intersection over union (IOU) with the historic detection region A is used as the current detection region of the current video frame. In this way, it can be ensured that the same target object is positioned by human body detection boxes at every moment.

In an optional implementation, the determining a first candidate detection region having a maximum intersection over union with the historic detection region in the plurality of first candidate detection regions as the current detection region includes: selecting a target quantity of target candidate detection regions from the plurality of first candidate detection regions, a confidence level of each target candidate detection region being greater than or equal to a confidence level of any first candidate detection region other than the target quantity of target candidate detection regions in the plurality of first candidate detection regions; and determining a first candidate detection region having a maximum intersection over union with the historic detection region in the target quantity of target candidate detection regions as the current detection region.

In some embodiments, when the first candidate detection region having the maximum confidence level in the plurality of first candidate detection regions is determined as the current detection region, a target quantity of target candidate detection regions are selected from the plurality of first candidate detection regions, for example, three target candidate detection regions B0, B1, and B2 are selected. A confidence level of each target candidate detection region is greater than or equal to a confidence level of any first candidate detection region other than the target quantity of target candidate detection regions in the plurality of first candidate detection regions, that is, confidence levels of the three target candidate detection regions B0, B1, and B2 are maximum confidence levels in confidence levels of the plurality of first candidate detection regions. Then, a first candidate detection region having a maximum intersection over union with the historic detection region in the target quantity of target candidate detection regions is determined as the current detection region. In this way, it can be ensured that the same target object is positioned by human body detection boxes at every moment.

In an optional implementation, before step S202 of detecting a target object in a current video frame of a target video stream, to obtain a current detection region for the target object, the method further includes: detecting a historic video frame adjacent to the current video frame, to obtain a plurality of second candidate detection regions; and determining a second candidate detection region having a maximum confidence level in the plurality of second candidate detection regions as the historic detection region when the historic video frame adjacent to the current video frame is the first video frame of the target video stream, a confidence level being used for indicating a probability that a corresponding second candidate detection region is determined as the historic detection region.

In some embodiments, before the current detection region associated with the target object in the target video stream is detected, a historic video frame adjacent to the current video frame is detected by using a first target model, to obtain a plurality of second candidate detection regions and confidence levels of the plurality of second candidate detection regions. The confidence levels of the second candidate detection regions are used for indicating probabilities that the second candidate detection regions are determined as the historic detection region. The historic detection region is a result obtained by detecting the target object in the historic video frame adjacent to the current video frame. Optionally, when the historic video frame adjacent to the current video frame is the first video frame of the target video stream, a second candidate detection region having a maximum confidence level in the plurality of second candidate detection regions is directly determined as the historic detection region.

In some embodiments, in the first video frame of the target video stream, a candidate detection region having a maximum confidence level in a plurality of candidate detection regions determined by a first target model may be determined as a result of an object detection region that needs to be obtained. In a next video frame, a candidate detection region having a maximum intersection over union with an object detection region of a previous video frame is selected as an object detection region that needs to be determined, to ensure that the same target object may be positioned by object detection regions at every moment.

Optionally, in some embodiments, when a detection region of the target object is detected, the detection region of the target object may be detected by using the method for detecting an object detection region at intervals of a plurality of frames, thereby improving the processing efficiency. Optionally, a first video frame has obtained a corresponding object detection region by using the foregoing method. A second video frame is a video frame after the first video frame in the target video stream. If the second video frame and the first video frame are spaced by a first quantity of video frames, a condition of performing detection at intervals of a plurality of frames is satisfied, and the second video frame may be detected by using the first target model, to obtain a plurality of third candidate detection regions and confidence levels of the plurality of third candidate detection regions. The confidence levels of the third candidate detection regions are used for indicating probabilities that the third candidate detection regions are determined as a detection region associated with the target object in the second video frame.

After the second video frame is detected by using the first target model, to obtain the plurality of third candidate detection regions and the confidence levels of the plurality of third candidate detection regions, a third candidate detection region having a maximum intersection over union with a detection region corresponding to the target object in a previous video frame adjacent to the second video frame in the plurality of third candidate detection regions may be determined as an object detection region associated with the target object in the second video frame.

In some embodiments, considering the processing performance, not all video frames obtain object detection regions by using the detection algorithm of an object detection region, and detection may be performed once at intervals of a first quantity of video frames by using the detection algorithm of an object detection region. A greater first quantity indicates higher processing efficiency and shorter time. Optionally, when confidence levels of object key points in the current video frame are generally low, the current video frame is detected by using a detection algorithm of a human body.

In some embodiments, not all video frames obtain human body detection boxes by using the detection algorithm of a human body. A detection result of a second set of key points of a historic video frame adjacent to the current video frame may be used to generate a human body detection box associated with the target object in the current video frame.

The historic detection region in some embodiments is used for indicating a region in which the target object is located in a target scenario displayed in an image of a historic video frame adjacent to the current video frame. The current detection region associated with the target object in the current detection region may be generated according to the second set of key points of the target object in the historic detection region. A region that is indicated by the current detection region and in which the target object is located in a target scenario displayed in an image of the current video frame includes a region in which the second set of key points is located. For example, the current detection region includes all object key points in the second set of key points. Side lengths of the smallest rectangular box including the second set of key points may be expanded by a target ratio, such as ⅕, in a vertical direction, to obtain the current detection region, thereby determining the current detection region associated with the target object in the target video.

In another optional implementation, step S208 of performing key point positioning on the target object based on the determined current detection region, to obtain a first set of key points includes: performing, when the target object in the current video frame is partially located in the determined current detection region, expanding on the determined current detection region by centering around a center of the determined current detection region, to obtain a target object detection box, where the so-called expanding may be specifically represented as adaptively increasing a width and a height of the determined current detection region, so that a region in which the target object in the current video frame is located in the target scenario is completely located in the target object detection box, and a target detection region is obtained after the expanding; and obtaining the first set of key points according to a target image including the target object in the target detection region.

In another optional implementation, the obtaining the first set of key points according to a target image including the target object in the target detection region includes: processing the target image to obtain a plurality of groups of confidence levels of the first set of key points, each group of confidence levels being used for predicting a location of one object key point in the first set of key points; constructing a target matrix by using the each group of confidence levels; determining first target coordinates according to a row and a column of a maximum confidence level in the each group of confidence levels in the corresponding target matrix; and determining the location of the one object key point in the first set of key points according to the first target coordinates.

In an object key point detection algorithm in some embodiments, a plurality of images including an object and a plurality of object key points may be used as data for training a second target sub-model, and the second target sub-model is trained based on deep learning by using the training data, to obtain a second target model. The object key points are used for indicating a part of the object, and the second target model may be a model that is established through initial detection.

Optionally, the object key point detection algorithm in some embodiments is based on an FPN in a deep learning model and a backbone network is a simplified visual geometry group (VGG) network. Optionally, in some embodiments, a convolutional layer is replaced with a residual block, and batch normalization and a parametric rectified linear unit (PReLU) activation function are used after the convolutional layer to improve the accuracy of detection of the object key points.

In some embodiments, the target image in the target object detection box is processed by using the second target model, and the target image may be inputted into the FPN, to obtain heat maps of the first set of key points. The heat maps correspond to a plurality of target matrices, and the target matrices are heat map matrices. The target image includes the target object, that is, the target image is a partial image block including a human body region. A size of a heat map obtained by using the FPN and a size of the inputted target image are in a proportional relationship, that is, sizes of the obtained target matrices and the size of the inputted target image also have a correspondence. A plurality of groups of confidence levels of the first set of key points may be obtained by using the FPN, each group of confidence levels being used for predicting a location of one object key point in the first set of key points. A target matrix is constructed by using the each group of confidence levels, each confidence level in the each group of confidence levels being used for predicting a location of a corresponding object key point on the target object. Optionally, the plurality of target matrices are 66 matrices, and are in a one-to-one correspondence with 66 object key points. Optionally, a first confidence level having the largest value is selected from the plurality of confidence levels, and first target coordinates $P_{m1}$ are determined according to a row number and a column number of the first confidence level in the target matrix, and then a location of the one object key point in the first set of key points is determined by using the first target coordinates.

When the location of the one object key point in the first set of key points is determined by using the first target coordinates, the target matrix and the inputted target image of the FPN have a correspondence, so that the locations of the key points in the first set on the target image may be reversely calculated according to such correspondence and the first target coordinates determined by using a row and a column of a maximum confidence level in the target matrix. Optionally, if the target image is determined by using an initial image, a location and a proportional relationship of the target image in the initial image are also determined, and then locations of the key points in the first set in the initial image may be calculated.

In another optional implementation, the determining the location of the one object key point in the first set of key points by using the first target coordinates includes: determining second target coordinates according to a row and a column of a second maximum confidence level in the each group of confidence levels in the target matrix; offsetting the first target coordinates toward the second target coordinates by a target distance; and determining, according to first target coordinates that are offset by the target distance, a location of the one object key point corresponding to the target matrix on the target object.

In some embodiments, due to the influence of noise, the energy of a heat map is mostly not normally distributed, and the accuracy of predicting point locations by using the maximum confidence level value is low. When the location of the one object key point in the first set of key points is determined by using the first target coordinates, second target coordinates $P_{m2}$ corresponding to the target matrix may be determined according to a row and a column corresponding to a second confidence level in the target matrix. The second confidence level is less than the first confidence level and greater than a third confidence level. The third confidence level is any confidence level other than the first confidence level and the second confidence level in a plurality of confidence levels. That is, the second confidence level is a second maximum confidence level in the plurality of confidence levels. Further, the first target coordinates are offset toward the second target coordinates by a target distance. For example, first target coordinates that are offset by the target distance are $P=P_{m1}+0.25*(P_{m2}-P_{m1})$. Therefore, the location of the one object key point corresponding to the target matrix on the target object is determined according to the first target coordinates that are offset by the target distance.

In some embodiments, the first set of key points is determined on the target object according to the foregoing method. For example, a first set of key points including 66 object key points is obtained.

Optionally, the current detection region is adjusted according to a first target ratio, and a target image including the target object in a determined current detection region is processed, to obtain the first set of key points.

Optionally, when the target image including the target object in the determined current detection region is processed to obtain object key points in the first set of key points, the method further includes: adjusting the first target coordinates according to a second target ratio, the second target ratio being a reciprocal of the first target ratio; and determining a location of a point corresponding to adjusted first target coordinates on the target object as a location of an object key point in the first set of key points on the target object.

In some embodiments, the target image processed by the first target model has a size requirement, for example, a width and a height are 192×256, that is, a ratio of 3:4. Because a target object detection box is difficult to ensure a ratio of 3:4, the target object detection box is adjusted according to the first target ratio, for example, the target object detection box is cut according to the ratio of 3:4, thereby making it convenient to zoom to 192×256, to be used as an input of the second target model, and further the target image including the target object in the determined current detection region is processed by using the second target model, to obtain the first set of key points.

In some embodiments, a first confidence level is selected from a plurality of confidence levels, and after first target coordinates are determined according to a row and a column corresponding to the first confidence level in the target matrix, the first target coordinates are adjusted according to a second target ratio. For example, the first target coordinates are reversely calculated as coordinates of an original target image according to a cutting location and a zooming scale of a human body detection box. Further, a point corresponding to adjusted first target coordinates on the target object in the current video frame is determined as an object key point in the first set of key points.

Optionally, in some embodiments, a size of a heat map and an input (target image) of a network are in a proportional relationship. A location of an object key point on the target image may be reversely calculated according to the proportional relationship and the size of the heat map. Because the target image is derived from a target detection region obtained by performing expanding on the determined current detection region, and the location and the proportional relationship are also determined, the location of the object key point in an image of the target detection region may be calculated.

By using the foregoing method, each object key point in the first set of key points may be determined, and further stabilization is performed on a location of the each object key point in the first set of key points by using a key point stabilization algorithm.

Figure 4:
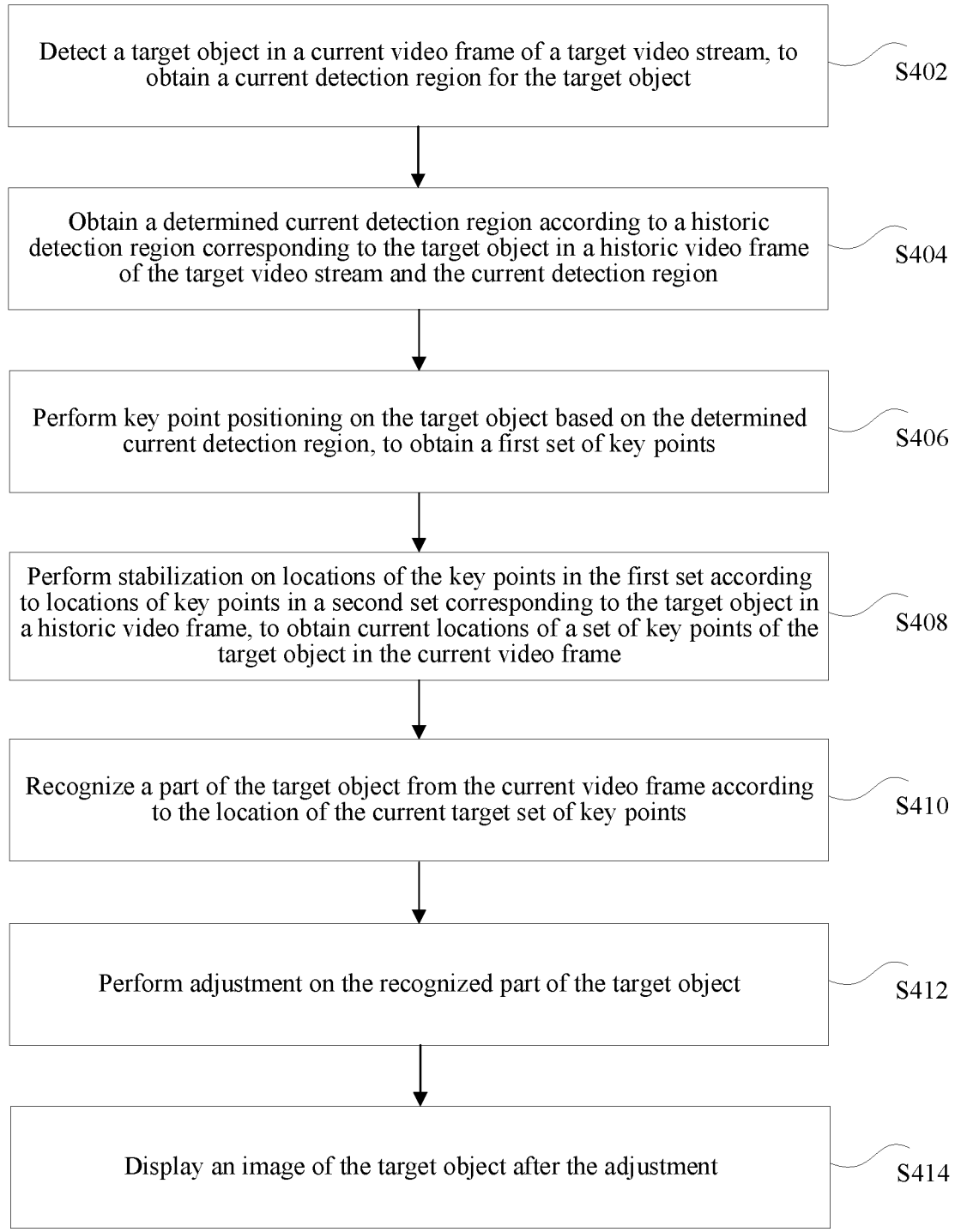
FIG. 4 is a flowchart of an image processing method according to an embodiment of the present disclosure.

FIG. 4 is a flowchart of an image processing method according to an embodiment of the present disclosure. As shown in FIG. 4, the method include the following steps:

Step S402. Detect a target object in a current video frame of a target video stream, to obtain a current detection region for the target object.

The technical solution provided in step S402 may include the technical solution provided in step S202.

Step S404. Obtain a determined current detection region according to a historic detection region corresponding to the target object in a historic video frame of the target video stream and the current detection region.

The technical solution provided in step S404 may include the technical solutions provided in step S204 and step S206.

Step S406. Perform key point positioning on the target object based on the determined current detection region, to obtain a first set of key points.

The technical solution provided in step S406 may include the technical solution provided in step S208.

Step S408. Perform stabilization on locations of the key points in the first set according to locations of the key points in a second set corresponding to the target object in the historic video frame, to obtain current locations of a set of key points of the target object in the current video frame.

The technical solution provided in step S408 may include the technical solutions provided in step S210 and step S212.

Step S410. Recognize a part of the target object from the current video frame according to the current locations of the set of key points of the target object.

In the technical solution provided in step S410 in the present disclosure, the current target object key point set is a key point set obtained after stabilization is performed on the first set of key points, and a jitter amplitude between the current target object key point set and a key point set of the target object in the historic video frame is small, thereby eliminating a prediction error of key points. In addition, each key point in the current target object key point set may be used for indicating one part of the target object. For example, when the target object is a human body, there are 66 key points in the current target object key point set, which are used for indicating 66 different parts on the human body, and an object contour is covered. Based on this, parts of the target object are accurately recognized from the current video frame according to the current locations of the set of key points of the target object. For example, parts such as ears, a mouth, a nose, and eyes of a human body are recognized. A jitter amplitude between a region in which a part of the target object is located and that is recognized in the current video frame and a region in which the part of the target object is located and that is recognized in the historic video frame is small.

Step S412. Perform adjustment on the recognized part of the target object.

After the part of the target object is recognized from the current video frame, an image of the recognized part of the target object is displayed, and further an adjustment instruction used for performing adjustment on the part is received. Optionally, a user determines, according to the displayed image of the part of the target object, a part that needs to be adjusted, triggers an adjustment instruction by performing an operation on the part that needs to be adjusted, and further performs real-time adjustment on the part of the target object in response to the adjustment instruction. For example, the user triggers a waist slimming instruction by adjusting a slider of a "waist slimming" function, and responds to the waist slimming instruction to adjust a waist slimming degree in real time. In some embodiments, part adjustment such as leg elongating and hip lifting may also be implemented. This is not limited herein.

Step S414. Display an image of the target object after the adjustment.

In the technical solution provided in step S414 in the present disclosure, the image of the target object after the adjustment may present an effect of adjusting the part of the target object. When the effect of adjusting the part of the target object does not reach a predetermined effect, adjustment may continue to be performed on the recognized part of the target object. Because the part of the target object is adjusted based on the stabilized first set of key points in some embodiments, an effect of adjusting the target object is more natural, thereby performing refined processing on the target object in real time, and avoiding the problem that a poor effect of processing the target object is caused because a jitter occurs between previous and subsequent video frames in the target video stream. Therefore, the effect of processing the target object is more realistic and natural, and a difference between the effect of processing the target object and a natural beautification effect that is accepted by the user is reduced.

In some embodiments, a detection algorithm of an object detection region and a detection algorithm of an object key point are based on a deep neural network method, and a stabilization algorithm may be based on a temporal-spatial filtering algorithm. The three algorithms are the core of real-time tracking of object key points, and decide the accuracy of the finally outputted object key points and the stability between the previous and subsequent video frames. By using the deep neural network method, domain data has quite good convergence and generalization performance. Therefore, both the human body detection box and the point positioning can achieve quite good precision. An objective of stabilizing the current detection region is to provide a stable background for detection of object key points, and reduce an error caused by a background change. Performing stabilization on the locations of the key points in the first set may eliminate a prediction error of points, represent stronger temporal-spatial consistency in the previous and subsequent video frame images, reduce a jitter, and improve the accuracy of detecting the object key points. Further, a part of the target object is adjusted by using the stabilized object key points, so that an effect of adjusting an object is more natural, to avoid a poor effect of processing the target object when a jitter occurs between previous and subsequent video frames in a video, thereby achieving the technical effect of improving the efficiency of processing the target object.

In the solutions provided in the present disclosure, any target object of which key points need to be positioned to improve the positioning accuracy may be detected. For example, the target object may be a target object having a motion ability. The target object may be a living body such as a human body or another animal (such as a dog or a cat). A process of detecting any type of target object is basically the same. For convenience of descriptions, the following is explained only by using an example in which the target object is a human body.

The following describes the technical solutions in the present disclosure with referent to another embodiment. Descriptions may be made by using an example in which the target object is a human body and the detection region is a human body detection box, and by using a detection algorithm of a human body and a stable tracking algorithm thereof, and a detection algorithm of 66 human body key points and a stable tracking algorithm thereof.

Figure 5:
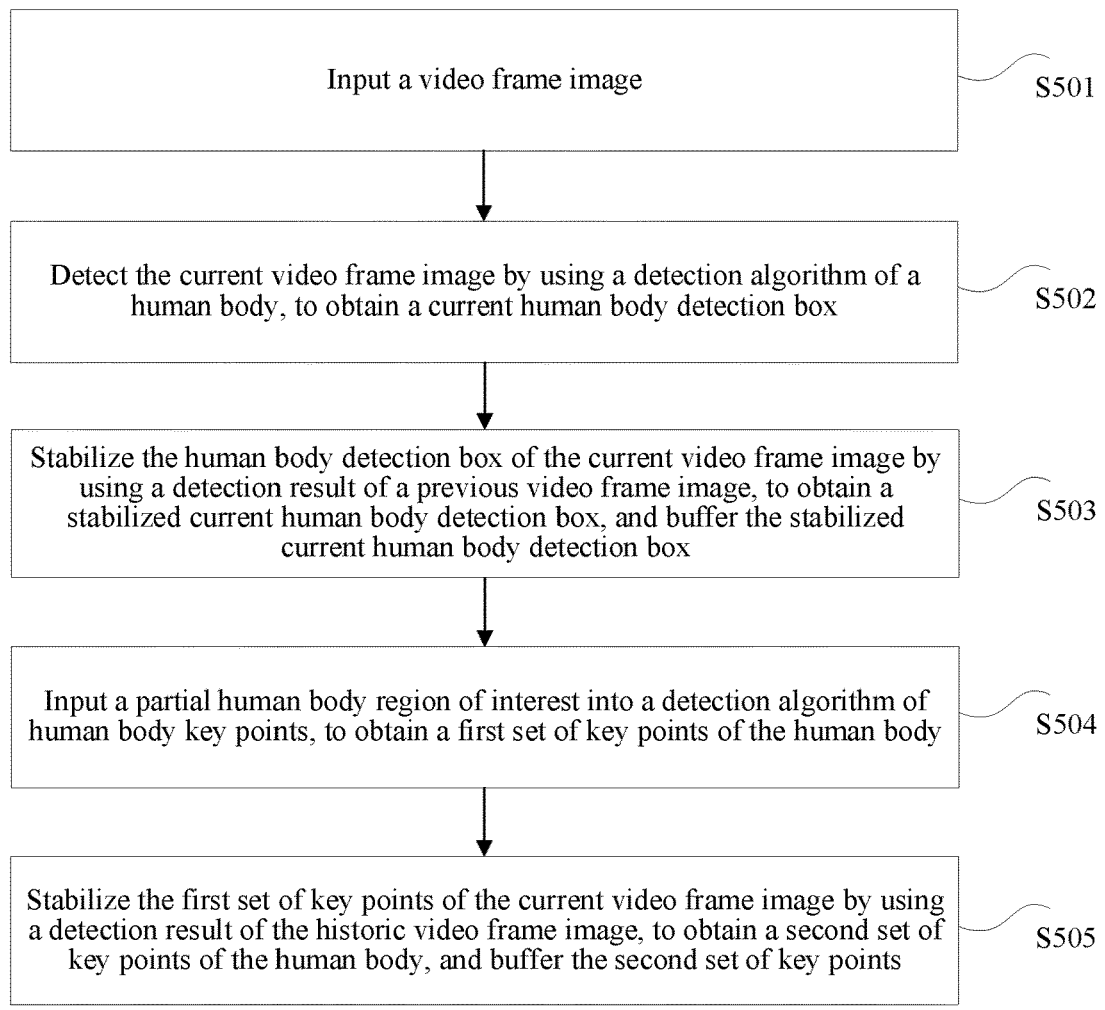
FIG. 5 is a flowchart of a human body key point positioning method according to an embodiment of the present disclosure.

FIG. 5 is a flowchart of a human body key point positioning method according to an embodiment of the present disclosure. As shown in FIG. 5, the method include the following steps:

Step S501. Input a video frame image.

A video in some embodiments may be a short video. The short video uses a figure as the theme, and includes a plurality of video frame images. A video frame image is inputted, the video frame image includes an image of a human body, and the image of the human body is positioned and tracked in the current video frame image.

Step S502. Detect the current video frame image by using a detection algorithm of a human body, to obtain a current human body detection box.

The detection algorithm of a human body performs detection based on a human body detection model trained by a deep neural network with relatively high performance. By using the deep neural network, domain data in the model has relatively good convergence and generalization performance. In this way, detection of the human body detection box can reach relatively good precision. During specific implementation, the human body detection model may be a MobileNetV1 network model trained based on an SSD architecture. During specific implementation, a quantity of channels of the network model may be reduced to ¼ of the original quantity according to a requirement on a mobile side, thereby facilitating deployment and acceleration of the model.

To ensure a model processing effect, in a specific image processing process, a size of the current video frame image is adjusted to 300×300 to be used as an input of the human body detection model. The human body detection model may output 1000 candidate human body detection boxes. The human body detection model may further output confidence levels of the candidate human body detection boxes, and the confidence levels are used for indicating probabilities that the candidate human body detection boxes are selected as a current human body detection box.

Considering that most short video scenarios use a figure as the theme, the short video scenario in the following is explained by using an example of detection and tracking of a figure. When the current video frame image is the first video frame image of the video, a human body detection box having a maximum confidence level in the 1000 candidate human body detection boxes of the current video frame image is determined as a box in which the human body is located, to obtain a current human body detection box A.

When the current video frame image is not the first video frame image of the video, multi-box verification needs to be performed. Three candidate human body detection boxes B0, B1, and B2 having maximum confidence levels and a human body detection box A of a previous video frame image of the current video frame image need to be selected for verification from the 1000 candidate human body detection boxes outputted by the human body detection model according to the current video frame image, to determine a current human body detection box corresponding to the current video frame image.

Figure 6:
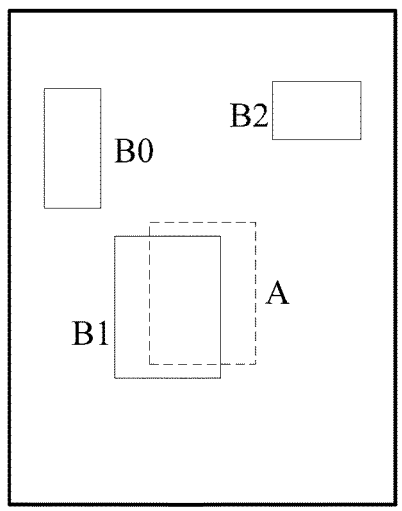
FIG. 6 is a schematic diagram of multi-box verification according to an embodiment of the present disclosure.

A verification process is explained below with reference to FIG. 6 being a schematic diagram of multi-box verification according to an embodiment of the present disclosure. The human body detection boxes B0, B1, and B2 are verified by using the human body detection box A. Intersections of union (IOU) between the human body detection box A and the human body detection box B0, between the human body detection box A and the human body detection box B1, and between the human body detection box A and the human body detection box B2 are respectively calculated, and an IOU is calculated as $$IOU(A, B) = \frac{\text{Area}(A \cap B)}{\text{Area}(A \cup B)},$$

that is, a ratio of a first area of an intersection between A and B to a second area of a union between A and B, where B is respectively B0, B1, and B2 in the calculation process.

The human body detection box B1 having the maximum IOU with the human body detection box A is selected from the human body detection boxes B0, B1, and B2 as the current human body detection box of the current video frame image, thereby ensuring that the same person is positioned by the human body detection boxes at every moment.

Optionally, to improve the positioning efficiency, a part of video frame images may be detected by using the detection algorithm of a human body, but in another part of video frame images, a human body detection box may be calculated by using locations of human body key points of a previous video frame as the current human body detection box of the current video frame image. Compared with a manner in which all video frame images are detected by using the detection algorithm of a human body, this manner can save computing resources and improve the positioning efficiency. Specifically, video frames that are detected by using the detection algorithm of a human body and video frames that are positioned depending on previous video frame images corresponding to the video frames may be flexibly configured in actual applications. For example, a manner of performing detection at intervals of a plurality of frames may be used. For example, detection is performed once by using the detection algorithm of a human body at intervals of four frames. For example, a first video frame is detected by using the detection algorithm of a human body, human body detection boxes of a second video frame to a fifth video frame are determined depending on human body key points detected in respective corresponding previous video frames, and a sixth video frame is detected by using the detection algorithm of a human body. The rest may be deduced by analogy. Intervallic detection is performed by using two manners. In this way, the operating efficiency can be improved, and a larger quantity of video frame images that are spaced indicates higher efficiency. Certainly, when detection is performed by using the detection algorithm of a human body may alternatively be decided by detecting confidence levels of human body key points. For example, only when it is detected that confidence levels of human body key points of the current video frame image are generally relatively low, the current video frame image is detected by using the detection algorithm of a human body.

Step S503. Stabilize the human body detection box of the current video frame image by using a detection result of a previous video frame image, to obtain a stabilized current human body detection box, and buffer the stabilized current human body detection box.

A region of the current human body detection box decides an input of the detection algorithm of human body key points, and the stability of a background in which the human body is located in the region also affects the stability of the human body key points in a video time sequence. Therefore, in some embodiments, a stable tracking algorithm of human body detection is used. The human body detection box of the current video frame image is stabilized by using a detection result of a previous video frame image, to obtain a stabilized current human body detection box, and the stabilized current human body detection box is buffered, thereby providing a stable background for detection of the human body key points of the current video frame image, so that backgrounds of inputs of the human body key point model of previous and subsequent video frame images are partially stabilized in time domain, and an error caused by a background change is reduced. The stable tracking algorithm of human body detection, that is, a box stabilization algorithm, is used for performing a stabilization operation on the human body detection box.

Optionally, when the human body detection box of the current video frame image is stabilized by using the detection result of the previous video frame image, it is set that when an IOU between the current human body detection box of the current video frame image and a human body detection box of the previous video frame image is greater than a target threshold, the human body detection box of the previous video frame image continues to be used as the human body detection box of the current video frame image. The target threshold may be 0.4. That is, in some embodiments, not only a box in which a human body is located may be calculated according to locations of human body key points of the previous video frame image as the current human body detection box of the current video frame image, but also box stabilization may be performed on the current human body detection box of the current video frame image by using the human body detection box of the previous video frame image. If the current video frame image is the first video frame image of the video, box stabilization does not need to be performed on the current human body detection box of the current video frame image.

Figure 7:
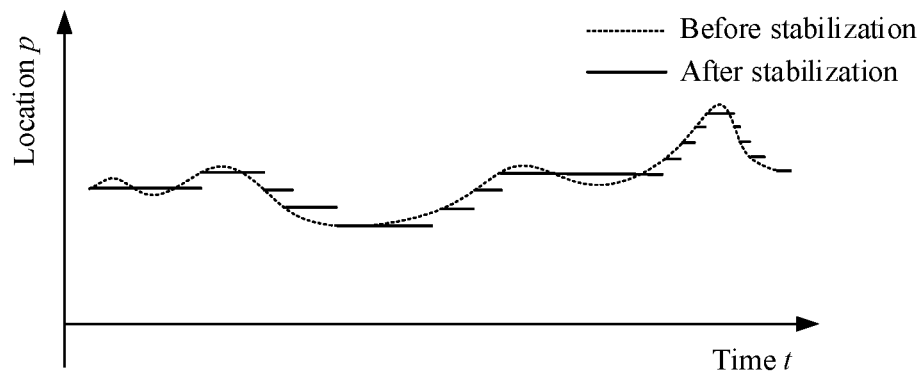
FIG. 7 is a schematic diagram of a location change of a human body detection box in a video frame image according to an embodiment of the present disclosure.

FIG. 7 is a schematic diagram of a location change of a human body detection box in a video frame image according to an embodiment of the present disclosure. As shown in FIG. 7, a location p (x or y component) of the human body detection box is converted from an original curve trajectory to a ladder trajectory, so that a size and the location of the human body detection box are unchanged in mostly partial time domain, and backgrounds of inputs of the human body key point model of previous and subsequent video frame images are partially stable in time domain.

Step S504. Input a partial human body region of interest into a detection algorithm of human body key points, to obtain a first set of key points of the human body.

The detection algorithm of human body key points in some embodiments is based on a deep neural network, so that domain data has quite good convergence and generalization performance, point positioning reaches quite good precision, and calculation may be performed by using a temporal-spatial filtering algorithm.

Optionally, the detection algorithm of human body key points in some embodiments may be based on an FPN in a deep learning model. The FPN mainly resolves a multi-scale problem in object detection. Through a simple network connection change, the performance of small object detection is greatly improved without substantially increasing a calculation amount of an original model.

Figure 8:
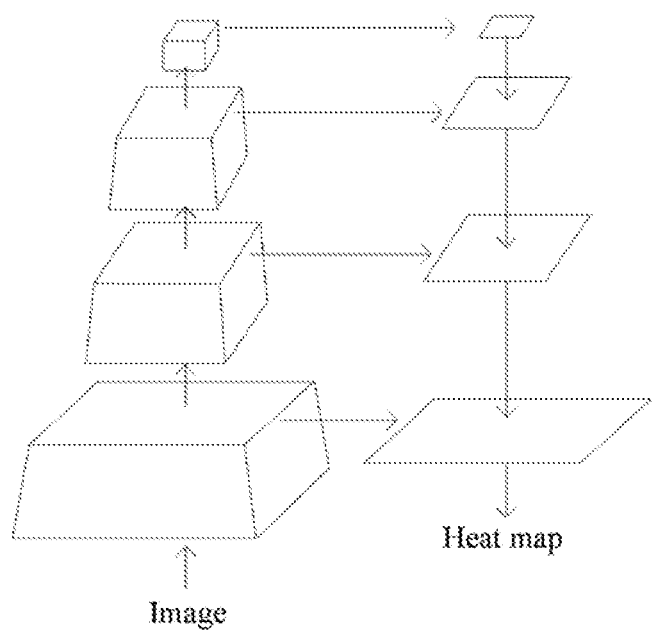
FIG. 8 is a schematic structural diagram of a feature pyramid network according to an embodiment of the present disclosure.

FIG. 8 is a schematic structural diagram of an FPN according to an embodiment of the present disclosure. As shown in FIG. 8, a video frame image is inputted, to obtain a key point heat map, and a backbone network is a simplified VGG network. Optionally, in some embodiments, a convolutional layer is replaced with a residual block, and batch normalization and a PReLU activation function are used after the convolutional layer to improve the accuracy of detection of the key points.

The detection algorithm of human body key points in some embodiments is designed based on an FPN structure and is only an example of some embodiments of the present disclosure. The detection algorithm of human body key points in some embodiments is not limited to being designed only based on the FPN structure. The detection algorithm of human body key points may alternatively be designed based on an HourGlass structure. The backbone network may alternatively be a small network such as a VGG network, MobileNetV1, MobileNetV2, ShuffleNetV1, or ShuffleNetV2 or a variant thereof. No limitation is imposed herein.

Figure 9:
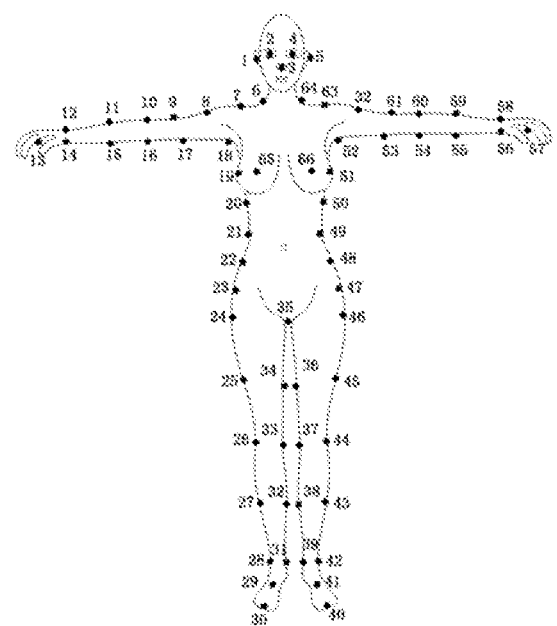
FIG. 9 is a schematic diagram of distribution of human body key points according to an embodiment of the present disclosure.

FIG. 9 is a schematic diagram of distribution of human body key points according to an embodiment of the present disclosure. As shown in FIG. 9, human body key points 1 to 66 are included, and are used for indicating a location of a part of a human body on the human body. As shown in Table 1, Table 1 is a human body key point definition table, which defines the human body key points. Left and right are determined according to orientations on an image.

TABLE 1 human body key point definition table

| Number | Descriptions |
| --- | --- |
| 1 | Left ear |
| 2 | Left eye |
| 3 | Nose |
| 4 | Right eye |
| 5 | Right ear |
| 6/64 | Left/Right neck |
| 7/63 | Left/Right shoulder |
| 8/62 | ⅓ of trisection of the contour from 7 to 10/1/3 of trisection of the contour from 63 to 60 |
| 9/61 | ⅔ of trisection of the contour from 7 to 10/2/3 of trisection of the contour from 63 to 60 |
| 10/60 | External point of left/right elbow joint |
| 11/59 | Midpoint of the contour from 10 to 11/midpoint of the contour from 60 to 59 |
| 12/58 | External point of left/right wrist joint |
| 13/57 | Center of left/right hand |
| 14/56 | Internal point of left/right wrist joint |
| 15/55 | Midpoint of the contour from 14 to 16/midpoint of the contour from 56 to 54 |
| 16/54 | Internal point of left/right elbow joint |
| 17/53 | Midpoint of the contour from 16 to 18/midpoint of the contour from 54 to 52 |
| 18/52 | Left/Right armpit |
| 19/51 | ⅙ of hexasection of the left contour of the body from 18 to 24/1/6 of hexasection of the right contour of the body from 52 to 46 |
| 20/50 | 2/6 of hexasection of the left contour of the body from 18 to 24/2/6 of hexasection of the right contour of the body from 52 to 46 |
| 21/49 | 3/6 of hexasection of the left contour of the body from 18 to 24/3/6 of hexasection of the right contour of the body from 52 to 46 |
| 22/48 | 4/6 of hexasection of the left contour of the body from 18 to 24/4/6 of hexasection of the right contour of the body from 52 to 46 |

TABLE 1-continued human body key point definition table

| Number | Descriptions |
| --- | --- |
| 23/47 | 5/6 of hexasection of the left contour of the body from 18 to 24/5/6 of hexasection of the right contour of the body from 52 to 46 |
| 24/46 | Lateral point of left/right thigh |
| 25/45 | Midpoint of the contour from 24 to 26/midpoint of the contour from 46 to 44 |
| 26/44 | Lateral point of left/right knee joint |
| 27/43 | Midpoint of the contour from 26 to 28/midpoint of the contour from 44 to 42 |
| 28/42 | Lateral point of left/right ankle |
| 29/41 | Left/Right instep |
| 30/40 | Left/Right tiptoe |
| 31/39 | Medial point of left/right ankle |
| 32/38 | Midpoint of the contour from 31 to 33/midpoint of the contour from 39 to 37 |
| 33/37 | Medial point of left/right knee joint |
| 34/36 | Midpoint of the contour from 33 to 35/midpoint of the contour from 37 to 35 |
| 35 | Medial point of thigh |
| 65/66 | Midpoint of left/right chest |

The human body key point network model in some embodiments is trained based on a large quantity of strictly annotated data. If ambiguity occurs in annotation, a failure in training the model is caused. Locations of human body key points defined according to the human body model in FIG. 9 are relatively clear. However, in actual scenarios, the motion of the human body is extremely complicated. In Table 1, "leftward", "rightward", "inward", and "outward" motions are usually difficult to be distinguished. Therefore, in some embodiments, a standard further needs to be defined. For example, a side first appearing on the body from left to right is the left side of the body, a shoulder first appearing from left to right is the left shoulder, and a thigh first appearing from left to right is the left thigh. Inside and outside are defined relative to the middle of the body. Ambiguity does not occur in data annotation according to this standard.

After the human body detection box of the current video frame image is stabilized by using the detection result of the previous video frame image, to obtain the stabilized human body detection box, the region of interest is inputted into the detection algorithm of human body key points, to obtain the first set of key points of the human body.

Optionally, due to the problem of the algorithm accuracy, the human body detection box positioned according to the stabilization mechanism does not necessarily just enclose the human body. To ensure that the entire human body is included, a rectangular region in which the human body is located needs to be expanded properly in some embodiments. The center of the human body detection box may be kept unchanged, and a width and a height of the human body detection box are adaptively increased, that is, the human body detection box is slightly enlarged outward.

Optionally, in some embodiments, a size of a heat map and an input image of a network are in a proportional relationship. A location of a human body key point on the target image may be reversely calculated according to the proportional relationship and the size of the heat map. Because the target image is derived from an original image, and a location of the original image and the proportional relationship are also determined, the location of the human body key point in the original image may be calculated.

Optionally, the detection algorithm of human body key points in some embodiments requires an input with a width of 192 and a height of 256, that is, a ratio of the width to the height is 3:4. Because the expanded historic detection region is difficult to ensure a ratio of 3:4, the expanded historic detection region needs to be processed to be in the ratio of 3:4, thereby making it convenient to zoom to 192×256, to be used as an input of the detection algorithm of human body key points. A region included in the expanded historic detection region may be a region of interest, and is a result obtained by performing secondary processing on the historic detection region. After processed to be in the ratio of 3:4, the expanded historic detection region is inputted into the FPN, to obtain heat maps of the 66 human body key points through prediction, that is, 66 matrices. The 66 human body key points are in a one-to-one correspondence with the 66 matrices, and each matrix is used for indicating a confidence level of a location of an element in the matrix. Optionally, in some embodiments, an image included in the original historic detection region may be mapped according to a location (a row number and a column number) of the maximum confidence level of the heat map matrix, and a coordinate value, that is, a point location, of a key point on the human body in the image included in the original historic detection region is reversely calculated.

However, due to the influence of noise, the energy of a heat map is mostly not normally distributed, and predicting point locations by using the maximum confidence level is inaccurate. Therefore, in some embodiments, prediction is performed on each heat map by offsetting a maximum point location $P_{m1}$ toward a second maximum point location $P_{m2}$ by a distance of ¼:

$$P=P_{m1}+0.25*(P_{m2}-P_{m1})$$

Therefore, partial coordinates of the 66 key points are obtained. Then, coordinates in the original image are reversely calculated according to a cutting location and a zooming scale 3:4 of the human body detection box, to determine the coordinates of the 66 key points on the human body.

Step S505. Stabilize the first set of key points of the human body of the current video frame image by using a detection result of the historic video frame image, to obtain a second set of key points of the human body, and buffer the second set of key points of the human body.

A stable tracking algorithm of human body key point detection in some embodiments, that is, a point stabilization algorithm, is used for performing a point stabilization operation on the human body key points of the human body. After a partial human body region of interest is inputted into the detection algorithm of human body key points, to obtain the first set of key points of the human body, the first set of key points of the human body of the current video frame image is stabilized through the stable tracking algorithm of human body key point detection by using a detection result of the historic video frame image, to obtain a second set of key points of the human body, and the second set of key points of the human body is buffered and outputted.

In some embodiments, human body key points of each frame may be calculated according to the detection algorithm of human body key points. However, due to existence of a prediction error, it seems that a jitter of point locations exists in the video. To reduce the jitter of point locations between video frames, a time domain point stabilization algorithm is needed. Assuming that a location of a key point in the $t^{th}$ frame is $p_t$ (a x component or a y component), weighting may be performed by using a location $\{p_{t-1}\}_{i=0:w}$ of a point corresponding to $p_t$ in the historic video frame image adjacent to the current video frame, to perform temporal-spatial filtering on $p_t$ and recalculate:

$$p_t = \frac{1}{\sum_{i=0}^{w} e^{-c_1(p_{t-i}-p_t)^2} e^{-c_2 i^2}} \sum_{i=0}^{w} p_{t-i} e^{-c_1(p_{t-i}-p_t)^2} \cdot e^{-c_2 i^2}$$

where the historic video frame image is first several video frame images adjacent to the current video frame, and w is used for indicating a quantity of historic video frame images, that is, a size of a window of a temporal-spatial filtering algorithm. Suitable values of $c_1$ and $c_2$ are selected according to the frame rate, and smoothing is respectively performed on the 66 key points, thereby ensuring that the point locations are stable in a video sequence.

In some embodiments, a prediction error of key points may be eliminated, stronger temporal-spatial consistency is presented in the previous and subsequent video frame images, and a jitter is reduced, thereby ensuring the accuracy and the stability of the human body key points in the previous and subsequent video frame images.

In some embodiments, a video frame image is inputted into a detection algorithm of a human body to detect a human body detection box, to obtain a current human body detection region, box stabilization is performed on the current human body detection region of the current video frame image through a stable tracking algorithm of human body detection by using a detection result of a previous video frame image, to obtain a historic detection region, expanding is performed on a stabilized historic detection region, to select a human body region of interest, the expanded historic detection region is inputted into a detection algorithm of human body key points, to obtain a first set of key points of the human body, and a stabilization operation is also performed on the current first set of key points of the human body based on a stable tracking algorithm of human body key point detection by using a detection result of a historic video frame, to obtain a second set of key points of the human body. Therefore, a part of the human body is adjusted by using the second set of key points of the human body, to satisfy a requirement of human body beautification, thereby achieving a refined beautification effect, and being close to a natural beautification effect that is accepted by a user.

In some embodiments, the detection algorithm of a human body and the detection algorithm of human body key points are based on a deep neural network method, and a stabilization algorithm may be based on a temporal-spatial filtering algorithm. The three algorithms are the core of real-time tracking of human body key points, and decide the accuracy of the finally outputted human body key points and the stability between the previous and subsequent video frames. By using the deep neural network method, domain data has quite good convergence and generalization performance. Therefore, both the human body detection box and the point positioning can achieve quite good precision. A box stabilization algorithm is used to provide a stable background for human body key point detection, to reduce an error caused by a background change. A point stabilization algorithm may eliminate a prediction error of points, represents stronger temporal-spatial consistency in the previous and subsequent video frame images, and reduces a jitter.

The solution in some embodiments may implement real-time positioning of human body key points covering the contour of a human body on a mobile side. First, a human body is positioned and tracked in the video, and partial detection and stabilization are performed on tracked partial key points. A human body detection model and a key point detection model are 3M in total, which may support 30 fps real-time body beautification on the mobile side, and has a more natural effect.

Some embodiments may be applied to a short video App, a mobile phone camera function, image processing software and the like, may implement face slimming, lipstick applying, skin buffing and the like in a scenario such as selfie or dancing, may also implement breast enlargement, waist slimming, leg elongating, leg slimming and the like, and may implement real-time special effects of waist slimming, leg elongating, and hip lifting; and can adapt to complicated actions of front, side, back, squat, and limbs postures, thereby satisfying human body beautification requirements in various scenarios.

Figure 10:
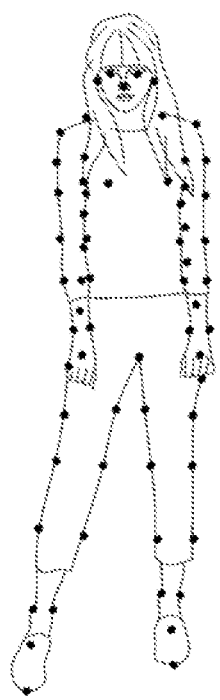
FIG. 10 is a schematic diagram of key point positioning according to an embodiment of the present disclosure.

FIG. 10 is a schematic diagram of key point positioning according to an embodiment of the present disclosure. As shown in FIG. 10, some embodiments shows a real-time key point tracking method on a mobile side, which covers the contour of a human body. The current video frame image includes a human body, and the human body includes 66 key points used for indicating locations of parts on the human body, as shown in Table 1. A stabilization operation is performed on the 66 key points of the human body. Specifically, a stabilization operation is performed on the 66 key points in the current video frame image by using a detection result of a historic video frame image, to obtain 66 stabilized key points.

Figure 11:
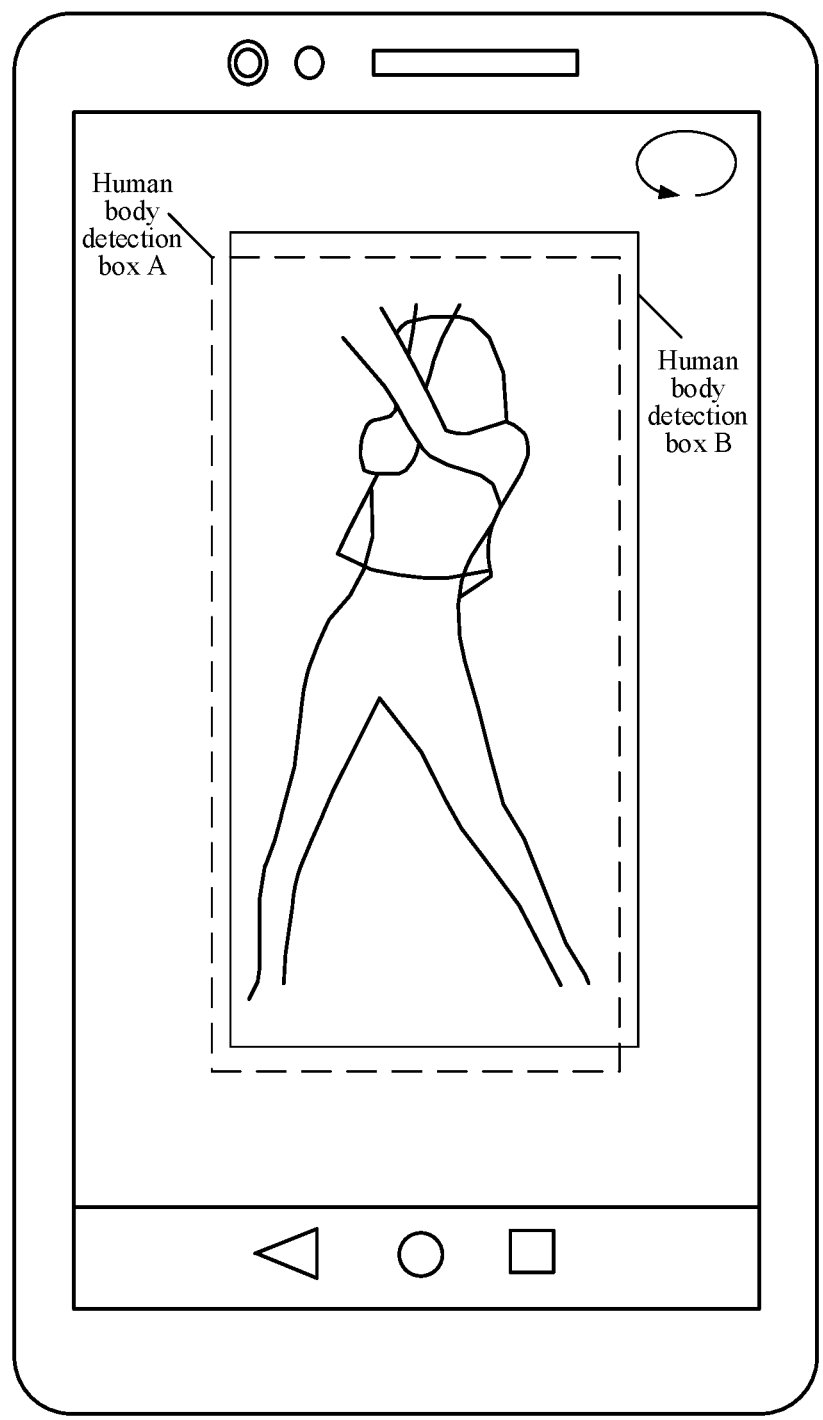
FIG. 11 is a schematic diagram of a scenario of detecting a human body detection box of a target human body according to an embodiment of the present disclosure.

FIG. 11 is a schematic diagram of a scenario of detecting a human body detection box of a target human body according to an embodiment of the present disclosure. As shown in FIG. 11, a dancing video of a target human body is shot by using a mobile terminal. The target human body in the video is detected, to determine a human body detection box of the target human body, and the human body detection box may enclose the contour of the target human body. A human body detection box A is used for indicating a location and a range of a region in which the target human body is located in a target scenario displayed in an image of the current video frame of the dancing video, and a human body detection box B is used for indicating a location and a range of a region in which the target human body is located in a target scenario displayed in an image of a historic video frame adjacent to the current video frame. An intersection over union is obtained by calculating a ratio of an area of an intersection between the human body detection box A and the human body detection box B to an area of a union between the human body detection box A and the human body detection box B.

$$IOU(A, B) = \frac{\text{Area}(A \cap B)}{\text{Area}(A \cup B)}$$

When the intersection over union between the human body detection box A and the human body detection box B is greater than a target threshold, the human body detection box B is directly determined as the human body detection box of the current video frame, so that a size and a location of the human body detection box are unchanged in mostly partial time domain, thereby performing stabilization on the human body detection box of the current video frame.

Figure 12:
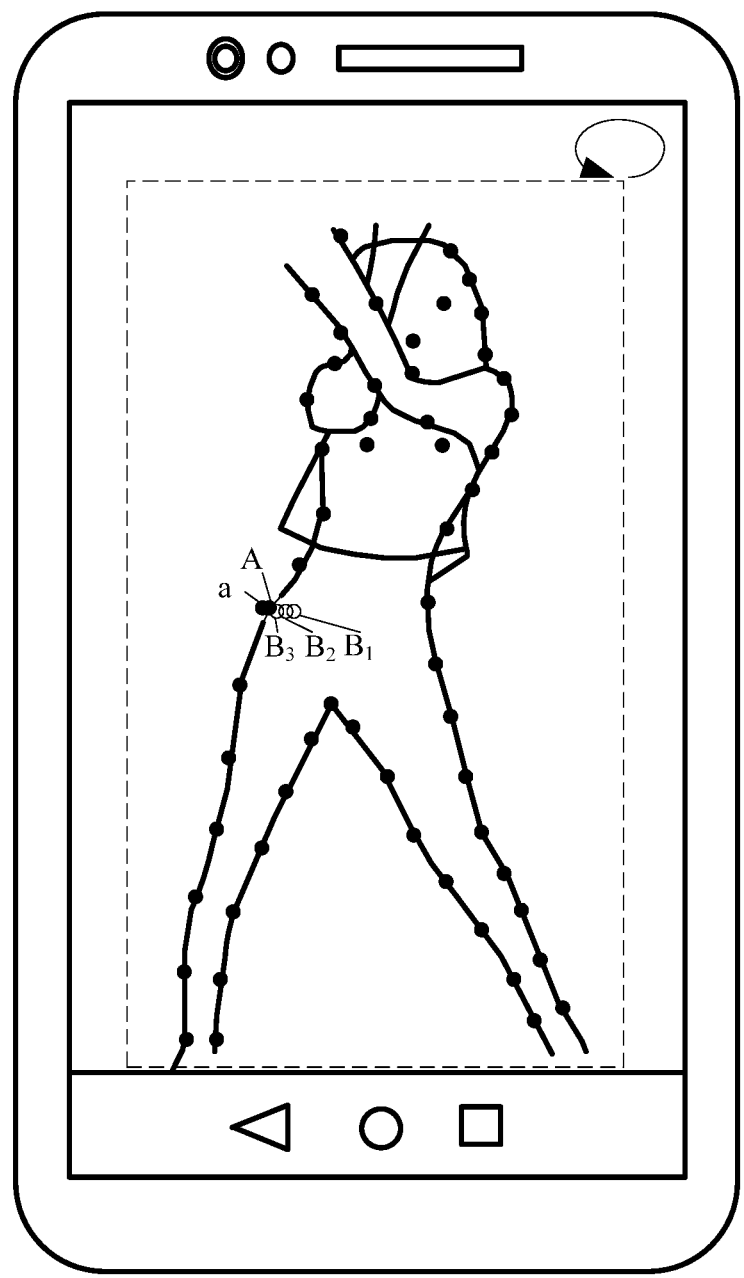
FIG. 12 is a schematic diagram of a scenario of detecting human body key points of a target human body according to an embodiment of the present disclosure.

FIG. 12 is a schematic diagram of a scenario of detecting human body key points of a target human body according to an embodiment of the present disclosure. As shown in FIG. 12, after it is determined that the human body detection box B shown in FIG. 11 is the human body detection box of the current video frame, an image included in the human body detection box B is inputted into a key point detection algorithm, to obtain a plurality of human body key points. Optionally, one human body key point is selected from the plurality of human body key points, and a stabilization operation is performed on a location a of a target human body key point corresponding to the current video frame based on a stabilization algorithm by using a location B1, a location B2, and a location B3 of target human body key points of historic video frames. Weighted summation may be performed on the location B1, the location B2, and the location B3, and smoothing is performed on the location a based on temporal-spatial filtering, to obtain a location A of the target key point on the target human body. The location A is a location obtained after stabilization is performed on the target human body key point at the location a on the target human body, to reduce a jitter of point locations between video frames.

Figure 13:
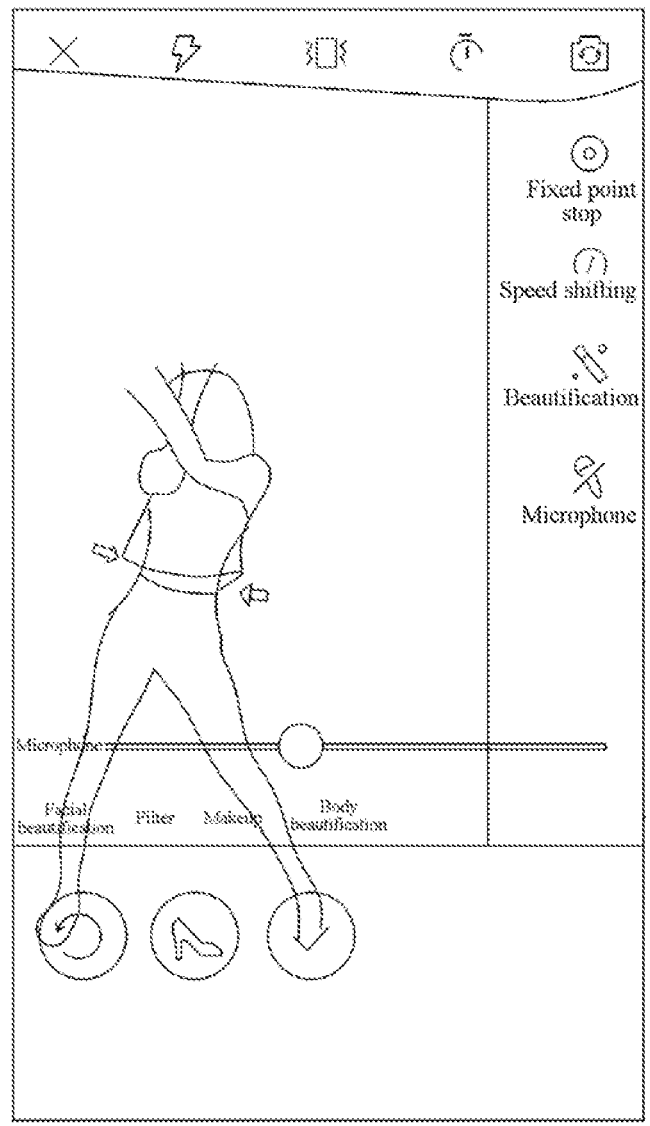
FIG. 13 is a schematic diagram of a body beautification function portal according to an embodiment of the present disclosure.

FIG. 13 is a schematic diagram of a body beautification function portal according to an embodiment of the present disclosure. As shown in FIG. 13, on a terminal, the body beautification function portal is entered, and a human body in a video frame is detected. After the stabilization operation is performed on 66 key points in a current video frame image, a prediction error of points is eliminated. Therefore, after stronger temporal-spatial consistency is presented in previous and subsequent video frame images, a part of the human body is adjusted by using stabilized key points. For example, a "waist slimming" function is selected, and a waist slimming degree is adjusted in real time by adjusting a slider of the "waist slimming" function, thereby slimming the waist of the human body, and achieving a more refined beautification effect, to be closer to a natural beautification effect that is accepted by a user.

Figure 14:
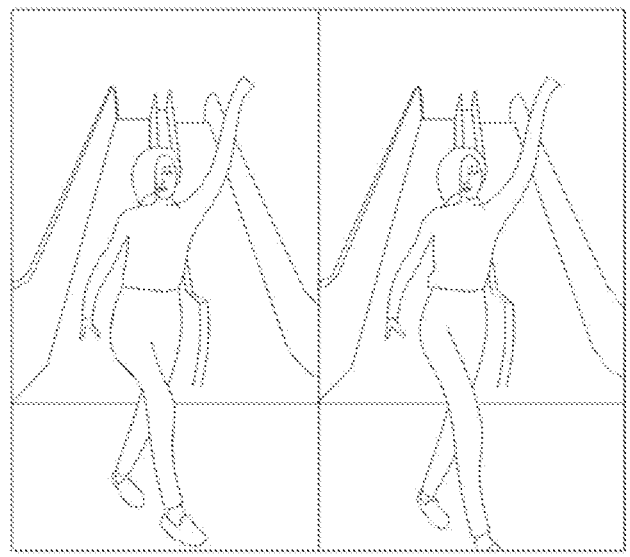
FIG. 14 is a schematic comparison diagram before and after body slimming according to an embodiment of the present disclosure.

FIG. 14 is a schematic comparison diagram before and after body slimming according to an embodiment of the present disclosure. As shown in FIG. 14, on a terminal, the body beautification function portal is entered, and a human body in a video frame is detected. After the stabilization operation is performed on 66 key points in a current video frame image, all parts of the human body are adjusted by using stabilized key points. For example, an entire body slimming function is selected, thereby slimming the human body, and achieving a more refined beautification effect, to be closer to a natural beautification effect that is accepted by a user.

In some embodiments, a body beautification function such as body slimming or leg elongating may be implemented in an auxiliary manner, and a body pendant is loaded, thereby avoiding a defect that manual intervention is needed for a PS solution of a single image, which is time-consuming and labor-consuming and is limited in an application scenario, and also avoiding a defect that an effect of simply stretching the human body is not realistic. Therefore, the efficiency of processing an object in a video is improved, and user experience is improved.

The stabilization operation may be performed on all human body key points by using the foregoing method, thereby respectively performing smoothing on the plurality of human body key points, and ensuring that the point locations are stable in a video sequence.

In another optional example, in some embodiments, the body beautification function portal is entered, and a human body in a video frame is detected. After the stabilization operation is performed on 66 key points in a current video frame image, a prediction error of points is eliminated.

Therefore, after stronger temporal-spatial consistency is presented in previous and subsequent video frame images, a part of the human body is adjusted by using stabilized human body key points. For example, a "waist slimming" function is selected, and a waist slimming degree is adjusted in real time by adjusting a slider of the "waist slimming" function, thereby slimming the waist of the human body, and achieving a more refined beautification effect, to be closer to a natural beautification effect that is accepted by a user.

In some embodiments, a stable background is provided for human body key point detection by using a box stabilization algorithm, to reduce an error caused by a background change. A point stabilization algorithm may eliminate a prediction error of points, represents stronger temporal-spatial consistency in the previous and subsequent video frame images, and reduces a jitter. Further, a part of the target human body is adjusted by using the stabilized human body key points, so that an effect of adjusting an object is more natural, to avoid a poor effect of processing the target human body when a jitter occurs between previous and subsequent video frames in a video, thereby implementing the technical effect of improving the efficiency of processing the target human body.

A body beautification function such as body slimming or leg elongating may be implemented in an auxiliary manner, and a body pendant is loaded, thereby avoiding a defect that manual intervention is needed for a PS solution of a single image, which is time-consuming and labor-consuming and is limited in an application scenario, and also avoiding a defect that an effect of simply stretching the human body is not realistic. Therefore, the efficiency of processing an object in a video is improved, and user experience is improved.

For ease of description, the foregoing method embodiments are stated as a series of action combinations. However, a person skilled in the art needs to know that the present disclosure is not limited on the sequence of the described actions because according to the present disclosure, some steps may use another sequence or may be simultaneously performed. In addition, a person skilled in the art needs to know that, the embodiments described in the specification are all exemplary embodiments and the related actions and modules are not mandatory to the present disclosure.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of the present disclosure essentially or the part contributing to the existing technology may be implemented in a form of a software product. The computer software product is stored in a storage medium (such as a read-only medium (ROM)/a random access memory (RAM), a magnetic disk or an optical disc) and includes several instructions for instructing a terminal device (which may be a mobile phone, a computer, a server, a network device, or the like) to perform the methods described in the embodiments of the present disclosure.

Figure 15:
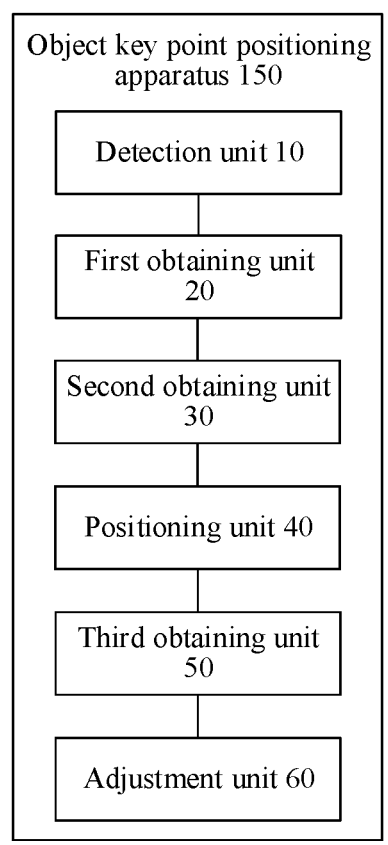
FIG. 15 is a schematic diagram of an object key point positioning apparatus according to an embodiment of the present disclosure.

According to another aspect of the embodiments of the present disclosure, an object key point positioning apparatus configured to implement the foregoing object key point positioning method is further provided. FIG. 15 is a schematic diagram of an object key point positioning apparatus according to an embodiment of the present disclosure. As shown in FIG. 15, the object key point positioning apparatus 150 may include: a detection unit 10, a first obtaining unit 20, a second obtaining unit 30, a positioning unit 40, a third obtaining unit 50, and an adjustment unit 60. In some embodiments, these units may be program units stored in one or more memories of the point positioning apparatus and executed by one or more processors of the point positioning apparatus. Each unit and other similar terms used in this disclosure (e.g., module) can be implemented using software (e.g., computer programs or algorithms developed to perform the described functions), hardware (e.g., processing circuitry and/or memory configured to perform the described functions), or a combination thereof.

The detection unit 10 is configured to detect a target object in a current video frame of a target video stream, to obtain a current detection region for the target object.

The first obtaining unit 20 is configured to obtain a historic detection region corresponding to the target object in a historic video frame of the target video stream.

The second obtaining unit 30 is configured to obtain a determined current detection region according to the historic detection region and the current detection region.

The positioning unit 40 is configured to perform key point positioning on the target object based on the determined current detection region, to obtain a first set of key points.

The third obtaining unit 50 is configured to obtain a second set of key points corresponding to the target object in the historic video frame of the target video stream.

The adjustment unit 60 is configured to perform stabilization on locations of the key points in the first set according to locations of the key points in the second set, to obtain current locations of a set of key points of the target object in the current video frame.

The second obtaining unit 30 includes an obtaining module, configured to obtain the determined current detection region according to the historic detection region and the current detection region when the historic video frame is a historic video frame adjacent to the current video frame.

The detection unit 10 in some embodiments may be configured to perform step S202 in the embodiments of the present disclosure, the first obtaining unit 20 in some embodiments may be configured to perform step S204 in the embodiments of the present disclosure, the second obtaining unit 30 in some embodiments may be configured to perform step S206 in the embodiments of the present disclosure, the positioning unit 40 in some embodiments may be configured to perform step S208 in the embodiments of the present disclosure, the third obtaining unit 50 in some embodiments may be configured to perform step S210 in the embodiments of the present disclosure, and the adjustment unit 60 in some embodiments may be configured to perform step S212 in the embodiments of the present disclosure.

Figure 16:
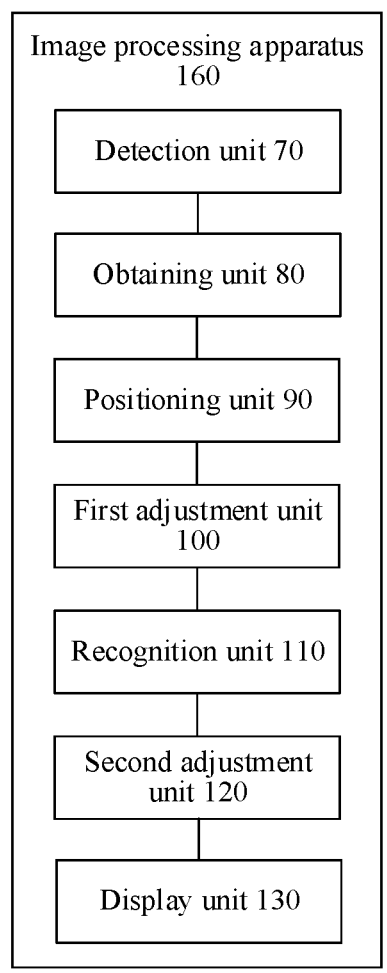
FIG. 16 is a schematic diagram of an image processing apparatus according to an embodiment of the present disclosure.

According to another aspect of the embodiments of the present disclosure, an object key point positioning apparatus configured to implement the foregoing object key point positioning method is further provided. FIG. 16 is a schematic diagram of an image processing apparatus according to an embodiment of the present disclosure. As shown in FIG. 16, the image processing apparatus 160 may include: a detection unit 70, an obtaining unit 80, a positioning unit 90, a first adjustment unit 100, a recognition unit 110, a second adjustment unit 120, and a display unit 130. In some embodiments, these units may be program units stored in one or more memories of the image processing apparatus and executed by one or more processors of the image processing apparatus. Each unit and other similar terms used in this disclosure (e.g., module) can be implemented using software (e.g., computer programs or algorithms developed to perform the described functions), hardware (e.g., processing circuitry and/or memory configured to perform the described functions), or a combination thereof.

The detection unit 70 is configured to detect a target object in a current video frame of a target video stream, to obtain a current detection region for the target object.

The obtaining unit 80 is configured to obtain a determined current detection region according to a historic detection region corresponding to the target object in a historic video frame of the target video stream and the current detection region.

The positioning unit 90 is configured to perform key point positioning on the target object based on the determined current detection region, to obtain a first set of key points.

The first adjustment unit 100 is configured to perform stabilization on locations of the key points in the first set according to locations of the key points in a second set corresponding to the target object in the historic video frame, to obtain current locations of a set of key points of the target object in the current video frame.

The recognition unit 110 is configured to recognize a part of the target object from the current video frame according to the current locations of the set of key points of the target object.

The second adjustment unit 120 is configured to perform adjustment on the recognized part of the target object.

The display unit 130 is configured to display an image of the target object after the adjustment.

The detection unit 70 in some embodiments may be configured to perform step S402 in the embodiments of the present disclosure, the obtaining unit 80 in some embodiments may be configured to perform step S404 in the embodiments of the present disclosure, the positioning unit 90 in some embodiments may be configured to perform step S406 in the embodiments of the present disclosure, the first adjustment unit 100 in some embodiments may be configured to perform step S408 in the embodiments of the present disclosure, the recognition unit 110 in some embodiments may be configured to perform step S410 in the embodiments of the present disclosure, the second adjustment unit 120 in some embodiments may be configured to perform step S412 in the embodiments of the present disclosure, and the display unit 130 in some embodiments may be configured to perform step S414 in the embodiments of the present disclosure.

Examples implemented by the above units and modules and application scenarios are the same as those of the corresponding steps, but are not limited to the contents disclosed in the above embodiments. As a part of the apparatus, the foregoing module may be run in the hardware environment shown in FIG. 1, and may be implemented by software or hardware, where the hardware environment includes a network environment.

According to still another aspect of the embodiments of the present disclosure, an electronic device configured to implement the object key point positioning method is further provided.

Figure 17:
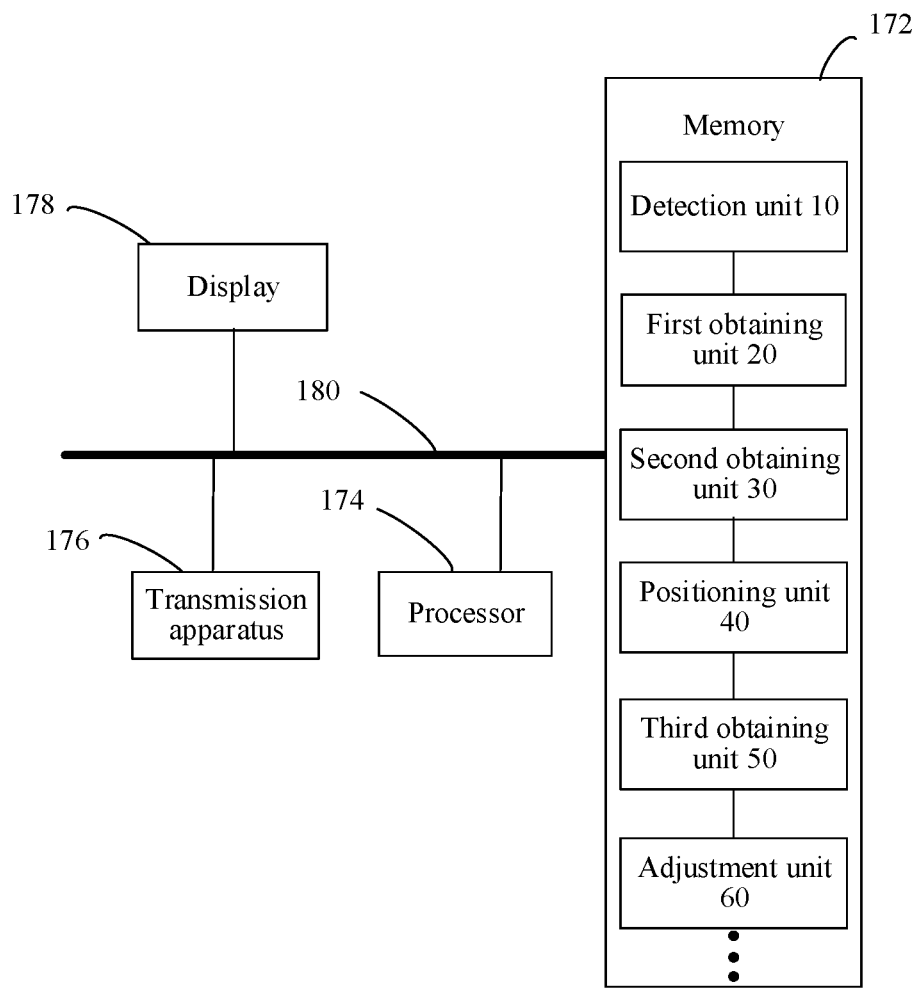
FIG. 17 is a structural block diagram of an electronic device according to an embodiment of the present disclosure.

FIG. 17 is a structural block diagram of an electronic device according to an embodiment of the present disclosure. As shown in FIG. 17, the electronic device includes a memory 172 and a processor 174. The memory stores a computer program. The processor is configured to perform the steps in any one of the foregoing method embodiments through the computer program.

Optionally, the electronic device may be located in at least one of a plurality of network devices in a computer network.

Optionally, the processor may be configured to perform steps S206 to S210 shown in FIG. 2 in the foregoing embodiments by executing the computer program.

Optionally, the processor may alternatively be configured to perform steps S402 to S412 shown in FIG. 4 in the foregoing embodiments through the computer program.

Optionally, the computer program, when executed, may further perform other steps in the foregoing embodiments. For specific steps, refer to the descriptions in the foregoing embodiments.

Optionally, a person of ordinary skill in the art may understand that, the structure shown in FIG. 17 is only illustrative. The electronic device may alternatively be a terminal device such as a smartphone (for example, an Android mobile phone or an iOS mobile phone), a tablet computer, a palmtop computer, a mobile Internet device (MID), or a PAD. FIG. 17 does not limit the structure of the electronic device. For example, the electronic device may further include more or fewer components (such as a network interface) than shown in FIG. 17, or have a configuration different from that shown in FIG. 17.

The memory 172 may be configured to store a software program and module, for example, a program instruction/module corresponding to the object key point positioning method and apparatus in the embodiments of the present disclosure. The processor 174 executes various functional applications and performs data processing by running the software program and module stored in the memory 172, that is, implements the foregoing object key point positioning method. The memory 172 may include a high-speed random access memory, and may further include a non-volatile memory, for example, one or more magnetic storage devices, flash memories, or other non-volatile solid state memories. In some examples, the memory 172 may further include memories remotely disposed relative to the processor 174, and the remote memories may be connected to the terminal through a network. Examples of the network include, but are not limited to, the Internet, an intranet, a local area network, a mobile communication network, and a combination thereof. The memory 172 may be specifically configured to, but is not limited to, store information such as video frames of a video, a human body detection box, and object key points. In an example, as shown in FIG. 17, the memory 172 may include, but is not limited to, the detection unit 10, the first obtaining unit 20, the second obtaining unit 30, the positioning unit 40, the third obtaining unit 50, and the adjustment unit 60 in the foregoing object key point positioning apparatus 150. In addition, the memory 172 may also include, but is not limited to, other module units in the object key point positioning apparatus, which will not be elaborated in this example.

The foregoing transmission apparatus 176 is configured to receive or transmit data through a network. Specific examples of the foregoing network can include a wired network and a wireless network. In an example, the transmission apparatus 176 includes a network interface controller (NIC). The NIC may be connected to another network device and a router by using a network cable, to communicate with the Internet or the local network. In one example, the transmission device 176 is a Radio Frequency (RF) module, which is configured to communicate with the Internet in a wireless manner.

In addition, the electronic device further includes: a display 178, configured to display an execution status of the target code in the first target function; and a connection bus 180, configured to connect various module components in the electronic device.

According to still another aspect of the embodiments of the present disclosure, a storage medium is further provided. The storage medium stores a computer program, the computer program being configured to perform, when run, steps in any one of the foregoing method embodiments.

Optionally, in some embodiments, the storage medium may be configured to store the computer program, and the computer program, when run, performs steps S206 to S210 shown in FIG. 2 in the foregoing embodiments.

Optionally, in some embodiments, the storage medium may be configured to store the computer program, and the computer program, when run, performs steps S402 to S412 shown in FIG. 4 in the foregoing embodiments.

Optionally, the computer program, when executed, may further perform other steps in the foregoing embodiments. For specific steps, refer to the descriptions in the foregoing embodiments. Optionally, in some embodiments, the foregoing storage medium may include but is not limited to: any medium that can store program code, such as a USB flash drive, a ROM, a RAM, a removable hard disk, a magnetic disk, or a compact disc.

The sequence numbers of the foregoing embodiments of the present disclosure are merely for description purpose and do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solution of the present disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of the present disclosure.

In the foregoing embodiments of the present disclosure, descriptions of the embodiments have different emphases. As for parts that are not described in detail in one embodiment, reference can be made to the relevant descriptions of the other embodiments.

In the several embodiments provided in the present disclosure, it is to be understood that the disclosed client can be implemented in other manners. The apparatus embodiments described above are merely exemplary. For example, the division of the units is merely the division of logic functions, and can use other division manners during actual implementation. For example, a plurality of units or components can be combined, or can be integrated into another system, or some features can be omitted or not performed. In addition, the coupling, or direct coupling, or communication connection between the displayed or discussed components can be the indirect coupling or communication connection through some interfaces, units, or modules, and can be in electrical or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of the present disclosure can be integrated into one processing unit, or each of the units can exist alone physically, or two or more units are integrated into one unit. The foregoing integrated unit can be implemented in the form of hardware, or can be implemented in the form of a software function unit.

The foregoing descriptions are merely exemplary implementations of the present disclosure. A person of ordinary skill in the art can further make several improvements and refinements without departing from the principle of the present disclosure, and the improvements and refinements shall fall within the protection scope of the present disclosure.

What is claimed is:

1. An image processing method, applied to a terminal device, and comprising:
    detecting a target object in a current video frame of a target video stream, to obtain a current detection region for the target object;
    obtaining a historic detection region corresponding to the target object in a historic video frame of the target video stream;
    adjusting the current detection region according to the historic detection region, to obtain a determined current detection region;
    performing key point positioning on the target object based on the determined current detection region, to obtain a first set of key points;
    obtaining a second set of key points corresponding to the target object in the historic video frame of the target video stream; and
    performing stabilization on locations of the key points in the first set according to locations of the key points in the second set, to obtain current locations of a set of key points of the target object in the current video frame, including:
        determining locations of first target object key points that are to be stabilized from the first set of key points;
        determining locations of second target object key points corresponding to a part indicated by the first target object key points from the second set of key points;
        performing weighting on the determined locations of all the second target object key points and the corresponding locations of the first target object key points, to obtain a weighted sum;
        determining a target coefficient by using a frame rate of the target video stream; and
        performing smoothing on the locations of the first target object key points according to the weighted sum and the target coefficient, to obtain stabilized locations of the first target object key points.

2. The method according to claim 1, wherein the adjusting the current detection region according to the historic detection region, to obtain a determined current detection region comprises:
    determining an intersection over union between the historic detection region and the current detection region;
    using the historic detection region as the determined current detection region when the intersection over union is greater than a target threshold; and
    using the current detection region as the determined current detection region when the intersection over union is less than or equal to the target threshold.

3. The method according to claim 1, wherein the detecting a target object in a current video frame of a target video stream, to obtain a current detection region for the target object comprises:

detecting the current video frame, to obtain a plurality of first candidate detection regions; and
determining a first candidate detection region having a maximum intersection over union with the historic detection region from the plurality of first candidate detection regions as the current detection region.

4. The method according to claim 1, wherein before the detecting a target object in a current video frame of a target video stream, to obtain a current detection region for the target object, the method further comprises:
detecting a first video frame of the target video stream, to obtain a plurality of second candidate detection regions;
using a second candidate detection region having a maximum confidence level in the plurality of second candidate detection regions as a detection region corresponding to the first video frame, and then using the detection region corresponding to the first video frame as a historic detection region of another video frame in the target video stream.

5. The method according to claim 1, wherein the performing key point positioning on the target object based on the determined current detection region, to obtain a first set of key points comprises:
performing, when the target object in the current video frame is partially located in the determined current detection region, expanding on the determined current detection region by centering around a center of the determined current detection region, to obtain a target detection region; and
obtaining the first set of key points according to a target image comprising the target object in the target detection region.

6. The method according to claim 5, wherein the obtaining the first set of key points according to a target image comprising the target object in the target detection region comprises:
processing the target image to obtain a plurality of groups of confidence levels of the first set of key points, each group of confidence levels being used for predicting a location of one object key point in the first set of key points;
constructing a target matrix by using the each group of confidence levels;
determining first target coordinates according to a row and a column of a maximum confidence level in the each group of confidence levels in the corresponding target matrix; and
determining the location of the one object key point in the first set of key points according to the first target coordinates.

7. The method according to claim 6, wherein the determining the location of the one object key point in the first set of key points according to the first target coordinates comprises:
determining second target coordinates according to a row and a column of a second maximum confidence level in the each group of confidence levels in the target matrix;
offsetting the first target coordinates toward the second target coordinates by a target distance; and
determining, according to first target coordinates that are offset by the target distance, a location of the one object key point corresponding to the target matrix on the target object.

8. The method according to claim 1, further comprising:
recognizing a part of the target object from the current video frame according to the current locations of the set of key points of the target object;
performing adjustment on the recognized part of the target object; and
displaying an image of the target object after the adjustment.

9. An image processing apparatus, comprising:
a memory and a processor, the memory being configured to store a computer program; and
the processor being configured to run the computer program, to perform the following actions:
detecting a target object in a current video frame of a target video stream, to obtain a current detection region for the target object;
obtaining a historic detection region corresponding to the target object in a historic video frame of the target video stream;
adjusting the current detection region according to the historic detection region, to obtain a determined current detection region;
performing key point positioning on the target object based on the determined current detection region, to obtain a first set of key points;
obtaining a second set of key points corresponding to the target object in the historic video frame of the target video stream; and
performing stabilization on locations of the key points in the first set according to locations of the key points in the second set, to obtain current locations of a set of key points of the target object in the current video frame, including:
determining locations of first target object key points that are to be stabilized from the first set of key points;
determining locations of second target object key points corresponding to a part indicated by the first target object key points from the second set of key points;
performing weighting on the determined locations of all the second target object key points and the corresponding locations of the first target object key points, to obtain a weighted sum;
determining a target coefficient by using a frame rate of the target video stream; and
performing smoothing on the locations of the first target object key points according to the weighted sum and the target coefficient, to obtain stabilized locations of the first target object key points.

10. The apparatus according to claim 9, wherein in response to performing the action of adjusting the current detection region according to the historic detection region, to obtain a determined current detection region, the processor is specifically configured to perform the following actions:
determining an intersection over union between the historic detection region and the current detection region;
using the historic detection region as the determined current detection region when the intersection over union is greater than a target threshold; and
using the current detection region as the determined current detection region when the intersection over union is less than or equal to the target threshold.

11. The apparatus according to claim 9, wherein in response to performing the action of detecting a target object in a current video frame of a target video stream, to obtain a current detection region for the target object, the processor is specifically configured to perform the following actions:
  detecting the current video frame, to obtain a plurality of first candidate detection regions; and
  determining a first candidate detection region having a maximum intersection over union with the historic detection region from the plurality of first candidate detection regions as the current detection region.

12. The apparatus according to claim 9, wherein before the detecting a target object in a current video frame of a target video stream, to obtain a current detection region for the target object, the processor is further configured to perform:
  detecting a first video frame of the target video stream, to obtain a plurality of second candidate detection regions;
  using a second candidate detection region having a maximum confidence level in the plurality of second candidate detection regions as a detection region corresponding to the first video frame, and then using the detection region corresponding to the first video frame as a historic detection region of another video frame in the target video stream.

13. The apparatus according to claim 9, wherein the performing key point positioning on the target object based on the determined current detection region, to obtain a first set of key points comprises:
  performing, when the target object in the current video frame is partially located in the determined current detection region, expanding on the determined current detection region by centering around a center of the determined current detection region, to obtain a target detection region; and
  obtaining the first set of key points according to a target image comprising the target object in the target detection region.

14. The apparatus according to claim 13, wherein the obtaining the first set of key points according to a target image comprising the target object in the target detection region comprises:
  processing the target image to obtain a plurality of groups of confidence levels of the first set of key points, each group of confidence levels being used for predicting a location of one object key point in the first set of key points;
  constructing a target matrix by using the each group of confidence levels;
  determining first target coordinates according to a row and a column of a maximum confidence level in the each group of confidence levels in the corresponding target matrix; and
  determining the location of the one object key point in the first set of key points according to the first target coordinates.

15. The apparatus according to claim 9, wherein the processor is further configured to perform:
  recognizing a part of the target object from the current video frame according to the current locations of the set of key points of the target object;
  performing adjustment on the recognized part of the target object; and
  controlling the display to display an image of the target object after the adjustment.

16. A non-transitory storage medium, storing a computer program, the computer program being configured to, when being run by a processor, cause the processor to perform:
  detecting a target object in a current video frame of a target video stream, to obtain a current detection region for the target object;
  obtaining a historic detection region corresponding to the target object in a historic video frame of the target video stream;
  adjusting the current detection region according to the historic detection region, to obtain a determined current detection region;
  performing key point positioning on the target object based on the determined current detection region, to obtain a first set of key points;
  obtaining a second set of key points corresponding to the target object in the historic video frame of the target video stream; and
  performing stabilization on locations of the key points in the first set according to locations of the key points in the second set, to obtain current locations of a set of key points of the target object in the current video frame, including:
    determining locations of first target object key points that are to be stabilized from the first set of key points;
    determining locations of second target object key points corresponding to a part indicated by the first target object key points from the second set of key points;
    performing weighting on the determined locations of all the second target object key points and the corresponding locations of the first target object key points, to obtain a weighted sum;
    determining a target coefficient by using a frame rate of the target video stream; and
    performing smoothing on the locations of the first target object key points according to the weighted sum and the target coefficient, to obtain stabilized locations of the first target object key points.

* * * * *